United States Patent
Takemoto et al.

(10) Patent No.: US 8,031,226 B2
(45) Date of Patent: Oct. 4, 2011

(54) IMAGE OUTPUT APPARATUS, IMAGE OUTPUT METHOD, IMAGE OUTPUT PROGRAM, IMAGE TRIMMING APPARATUS, IMAGE TRIMMING METHOD, AND IMAGE TRIMMING PROGRAM

(75) Inventors: Fumito Takemoto, Kanagawa (JP); Akira Yoda, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 1555 days.

(21) Appl. No.: 11/364,246

(22) Filed: Mar. 1, 2006

(65) Prior Publication Data
US 2006/0204044 A1 Sep. 14, 2006

(30) Foreign Application Priority Data
Mar. 1, 2005 (JP) ................... 2005-056201

(51) Int. Cl.
H04N 5/225 (2006.01)
G06K 9/00 (2006.01)
H04N 7/12 (2006.01)
H04N 11/02 (2006.01)
H04N 11/04 (2006.01)

(52) U.S. Cl. .............. 348/169; 348/207.1; 382/103; 382/107; 375/240.6

(58) Field of Classification Search .......... 348/169–172, 348/699–701, 208.14, 207.2; 382/103, 107
See application file for complete search history.

(56) References Cited

U.S. PATENT DOCUMENTS

| | | | | |
|---|---|---|---|---|
| 6,005,609 A | * | 12/1999 | Cheong | 348/169 |
| 2002/0030739 A1 | * | 3/2002 | Nagaya et al. | 348/143 |
| 2002/0051057 A1 | * | 5/2002 | Yata | 348/142 |
| 2002/0159637 A1 | * | 10/2002 | Echigo et al. | 382/190 |
| 2002/0181741 A1 | * | 12/2002 | Masukura et al. | 382/103 |
| 2003/0151667 A1 | * | 8/2003 | Nakami et al. | 348/207.1 |
| 2003/0227493 A1 | | 12/2003 | Yokomizo | |
| 2004/0008774 A1 | * | 1/2004 | Takahashi et al. | 375/240.12 |
| 2004/0054659 A1 | * | 3/2004 | McIntyre | 707/3 |

FOREIGN PATENT DOCUMENTS

| | | |
|---|---|---|
| JP | 6-337938 A | 12/1994 |
| JP | 2000-187477 A | 7/2000 |
| JP | 2004-15288 A | 1/2004 |
| JP | 2004-178368 A | 6/2004 |

OTHER PUBLICATIONS

Japanese Office Action issued Dec. 14, 2010, in JP-2006-049323.

* cited by examiner

*Primary Examiner* — Sinh Tran
*Assistant Examiner* — Christopher K Peterson
(74) *Attorney, Agent, or Firm* — Birch, Stewart, Kolasch & Birch, LLP

(57) ABSTRACT

An image output apparatus according to the present invention includes: a moving image constituting image extracting section that extracts a moving-image constituting image from a moving image having a plurality of moving-image constituting images; a moving direction specifying section that specifies a moving direction, in the moving image, of an object included in the moving-image constituting image extracted from the moving image constituting image extracting section based on the change of position of the object in the plurality of continued moving-image constituting images; an image layout section that lays out the moving-image constituting image extracted from the moving image constituting image extracting section in an output area based on the moving direction of object specified by the moving direction specifying section; and an image outputting section that outputs the moving-image constituting image laid-out by the image layout section on the output area.

21 Claims, 16 Drawing Sheets

IMAGE OUTPUT APPARATUS, IMAGE OUTPUT METHOD, IMAGE OUTPUT PROGRAM, IMAGE TRIMMING APPARATUS, IMAGE TRIMMING METHOD, AND IMAGE TRIMMING PROGRAM

CROSS REFERENCE TO RELATED APPLICATION

The present application claims priority from a Japanese Patent Application No. 2005-056201 filed on Mar. 1, 2005, the contents of which are incorporated herein by reference.

BACKGROUND OF THE INVENTION

1. Field of the Invention

The present invention relates to an image output apparatus, an image output method, an image output program, an image trimming apparatus, an image trimming method, and an image trimming program. More particularly, the present invention relates to an image output apparatus, an image output method, an image output program, an image trimming apparatus, an image trimming method, and an image trimming program, for extracting moving-image constituting images from a moving image to lay out the extracted images.

2. Related Art

A technique for extracting distinctive frame images from a taken moving image to record the extracted images as a representative image of the moving image based on the change of capturing circumstances and the change of movement of subject is proposed as disclosed, for example, in Patent Document 1. Moreover, a technique for automatically extracting a subject watched by an appreciator from a taken moving image and performing an image processing on the subject to enlarge and display the subject to the easily viewable size is proposed as disclosed, for example, in Patent Document 2.

Patent Document 1: Japanese Patent Application Publication No. 2000-187477

Patent Document 2: Japanese Patent Application Publication 2004-178368

However, when making an album by means of frame images extracted from a moving image, it is necessary to confirm and layout all extracted frame images, in order to form a good-looking layout for an appreciator. Moreover, when frame images are extracted from a moving image to be automatically laid out, there is a problem that an appreciator may sense a discomfort at the made layout.

SUMMARY OF THE INVENTION

Therefore, it is an object of the present invention to provide an image output apparatus, an image output method, an image output program, an image trimming apparatus, an image trimming method, and an image trimming program that can solve the foregoing problems. The above and other objects can be achieved by combinations described in the independent claims. The dependent claims define further advantageous and exemplary combinations of the present invention.

That is, according to the first aspect of the present invention, there is provided an image output apparatus that outputs images. The image output apparatus includes: a moving image constituting image extracting section that extracts a moving-image constituting image from a moving image having a plurality of moving-image constituting images; a moving direction specifying section that specifies a moving direction, in the moving image, of an object included in the moving-image constituting image extracted from said moving image constituting image extracting section based on the change of position of the object in the plurality of continued moving-image constituting images; an image layout section that lays out the moving-image constituting image extracted from said moving image constituting image extracting section in an output area based on the moving direction of object specified by said moving direction specifying section; and an image outputting section that outputs the moving-image constituting image laid-out by said image layout section on the output area.

Moreover, the image layout section may lay out the moving-image constituting image extracted from said moving image constituting image extracting section so that the moving direction of object specified by said moving direction specifying section faces a central direction of the output area. Moreover, the moving image constituting image extracting section may extract the plurality of continued moving-image constituting images from the moving image, and the image layout section may serially lay out the plurality of moving-image constituting images extracted from said moving image constituting image extracting section along the moving direction specified by said moving direction specifying section.

Further, the image output apparatus may further include: a moving speed computing section that computes a moving speed, in the moving image, of the object included in the moving-image constituting image extracted from said moving image constituting image extracting section based on the change of position of the object in the plurality of moving-image constituting images continued following the moving-image constituting image extracted from said moving image constituting image extracting section; and a trimming section that trims off a partial image including an object, of which the moving speed computed from said moving speed computing section is larger than a predetermined reference speed, from the moving-image constituting image extracted from said moving image constituting image extracting section, and the image layout section may lay out the partial image trimmed by said trimming section in the output area based on the moving direction of object specified by said moving direction specifying section.

Moreover, the trimming section may trim off a partial image including an object, of which the moving speed computed from said moving speed computing section is the largest, from the moving-image constituting image extracted from said moving image constituting image extracting section. Further, the trimming section may trim off a partial image including an object, of which an area is the largest in the moving-image constituting image, among objects of which the moving speed computed from said moving speed computing section is larger than the predetermined reference speed from the moving-image constituting image extracted from said moving image constituting image extracting section. Moreover, the image outputting section may have a display section for displaying the moving-image constituting image laid-out by said image layout section, and the image layout section may lay out the moving-image constituting image in an output area on a display screen of said display section based on the moving direction of object specified by said moving direction specifying section.

Moreover, the image outputting section may have a print section for printing the moving-image constituting image laid-out by said image layout section, and the image layout section may lay out the moving-image constituting image in an output area on a printing medium of said print section based on the moving direction of object specified by said moving direction specifying section.

Moreover, the image output apparatus may further include: a template storing section that stores a template of an output area for which an image arrangement position and a moving direction of an object included in the moving-image constituting image to be arranged at the image arrangement position are predetermined; and an image selecting section that selects a moving-image constituting image, in which a moving direction of an object associated with the image arrangement position included in the template stored on said template storing section and the moving direction of object specified by said moving direction specifying section are identical with each other, from the moving-image constituting images extracted from said moving image constituting image extracting section, and the image layout section may lay out the moving-image constituting image selected by said image selecting section at the image arrangement position in the template.

Further, the image selecting section may select a moving-image constituting image, around which the size of an area within a moving-image constituting image existing in the moving direction of object specified by said moving direction specifying section is larger than the size of an area within a moving-image constituting image existing in the direction opposite to the direction specified by said moving direction specifying section, from the plurality of continued moving-image constituting images. Moreover, the image output apparatus may further include a trimming image generating section that trims off an object included in the moving-image constituting image selected by said image selecting section to generate a trimming image so that the size of an area within a moving-image constituting image existing in the moving direction of object specified by said moving direction specifying section is larger than the size of an area within a moving-image constituting image existing in the direction opposite to the direction of object specified by said moving direction specifying section, and the image layout section may lay out the trimming image generated from said trimming image generating section at the image arrangement position in the template.

Moreover, the image output apparatus may further include a transformed image generating section that generates an image made by performing geometric transformation on a moving-image constituting image, so that the moving direction of object specified by said moving direction specifying section and the moving direction of object associated with the image arrangement position of the template stored on said template storing section are identical with each other, when there is not a moving-image constituting image in which the moving direction of object specified by said moving direction specifying section and the moving direction of object associated with the image arrangement position of the template stored on said template storing section are identical with each other, and the image layout section may lay out the image generated from said transformed image generating section at the image arrangement position. Further, the image output apparatus may further include a trimming section that trims off the image generated from said transformed image generating section in the shape of an image arrangement frame of the image arrangement position, and the image layout section may lay out the image trimmed by said trimming section at the image arrangement position.

Further, the image output apparatus may further include an image rotation processing section that rotates a moving-image constituting image along a horizontal direction of a surface on the moving-image constituting image, so that the moving direction of object specified by said moving direction specifying section and the moving direction associated with the image arrangement position of the template stored on said template storing section are identical with each other, when there is not a moving-image constituting image in which the moving direction of object specified by said moving direction specifying section and the moving direction associated with the image arrangement position of the template stored on said template storing section are identical with each other, and the image layout section may lay out the moving-image constituting image rotated by said image rotation processing section at the image arrangement position in the template. Moreover, the image output apparatus may further include a trimming section that trims off the moving-image constituting image rotated by said image rotation processing section in the shape of an image arrangement frame of the image arrangement position, and the image layout section may lay out the image trimmed by said trimming section at the image arrangement position.

Moreover, the image output apparatus may further include a moving speed computing section that computes a moving speed, in a moving image, of the object included in the moving-image constituting image extracted from said moving image constituting image extracting section based on the change of position of the object in a plurality of moving-image constituting images continued following the moving-image constituting image extracted from said moving image constituting image extracting section, and the image selecting section may select a moving-image constituting image in which the size of an area is larger among moving-image constituting images existing in the moving direction of object specified by said moving direction specifying section when the moving speed of object computed from said moving speed computing section is larger. Further, the image output apparatus may further include a trimming image generating section that trims off an object included in the moving-image constituting image selected by said image selecting section to generate a trimming image, so that the size of area within a moving-image constituting image existing in the moving direction of object specified by said moving direction specifying section is larger than the size of area within a moving-image constituting image existing in a direction opposite to the moving direction of object specified by said moving direction specifying section, when the moving speed of object computed from said moving speed computing section is larger, and the image layout section may lay out the trimming image generated from said trimming image generating section at the image arrangement position in the template.

Further, the image output apparatus may further include: a template storing section that stores a template of an output area for which a first image arrangement position at which a first moving-image constituting image should be arranged and a second image arrangement position at which a second moving-image constituting image should be arranged are predetermined; a first image selecting section that selects the first moving-image constituting image to be arranged at the first image arrangement position; a moving direction determining section that determines a moving direction of an object included in the second moving-image constituting image to be arranged at the second image arrangement position according to a moving direction of an object included in the first moving-image constituting image selected by said first image selecting section; and a second image selecting section that selects the second moving-image constituting image including an object with the moving direction determined by said moving direction determining section, and the image layout section may lay out the first moving-image constituting image selected by said first image selecting section at the first image arrangement position and the second moving-image constituting image selected by said second image selecting section at the second image arrangement position.

Moreover, the template storing section may store a template of an output area for which the second image arrangement position and a moving direction of an object relative to the moving direction of object included in the first moving-image constituting image are predetermined, and the moving direction determining section may determine a moving direction of an object included in the second moving-image constituting image to be arranged at the second image arrangement position based on the moving direction of object included in the first moving-image constituting image selected by said first image selecting section and the relative moving direction of object stored on said template storing section.

According to the second aspect of the present invention, there is provided an image output method for outputting images. The method includes: a moving image constituting image extracting step of extracting a moving-image constituting image from a moving image having a plurality of moving-image constituting images; a moving direction specifying step of specifying a moving direction, in the moving image, of an object included in the moving-image constituting image extracted in said moving image constituting image extracting step based on the change of position of the object in the plurality of continued moving-image constituting images; an image layout step of laying out the moving-image constituting image extracted in said moving image constituting image extracting step in an output area based on the moving direction of object specified in said moving direction specifying step; and an image outputting step of outputting the moving-image constituting image laid-out in said image layout step on the output area.

According to the third aspect of the present invention, there is provided an image output program for an image output apparatus that outputs images. The program makes the image output apparatus function as: a moving image constituting image extracting section that extracts a moving-image constituting image from a moving image having a plurality of moving-image constituting images; a moving direction specifying section that specifies a moving direction, in the moving image, of an object included in the moving-image constituting image extracted from said moving image constituting image extracting section based on the change of position of the object in the plurality of continued moving-image constituting images; an image layout section that lays out the moving-image constituting image extracted from said moving image constituting image extracting section in an output area based on the moving direction of object specified by said moving direction specifying section; and an image outputting section that outputs the moving-image constituting image laid-out by said image layout section on the output area.

According to the fourth aspect of the present invention, there is provided an image trimming apparatus that trims off a partial image from an image. The image trimming apparatus includes: a moving image constituting image extracting section that extracts a moving-image constituting image from a moving image having a plurality of moving-image constituting images; a moving speed computing section that computes a moving speed, in the moving image, of an object included in the moving-image constituting image extracted from said moving image constituting image extracting section based on the change of position of the object in the plurality of moving-image constituting images continued following the moving-image constituting image extracted from said moving image constituting image extracting section; and a trimming section that trims off a partial image including an object of which the moving speed computed from said moving speed computing section is larger than a predetermined reference speed, from the moving-image constituting image extracted from said moving image constituting image extracting section.

Moreover, the image trimming apparatus may further include: an image layout section that lays out the partial image trimmed by said trimming section in an output area; and an image outputting section that outputs the partial image laid-out by said image layout section on the output area.

Moreover, according to the fifth aspect of the present invention, there is provided an image trimming method for trimming off a partial image from an image. The image trimming method includes: a moving image constituting image extracting step of extracting a moving-image constituting image from a moving image having a plurality of moving-image constituting images; a moving speed computing step of computing a moving speed, in the moving image, of an object included in the moving-image constituting image extracted in said moving image constituting image extracting step based on the change of position of the object in the plurality of moving-image constituting images continued following the moving-image constituting image extracted in said moving image constituting image extracting step; and a trimming step of trimming off a partial image including an object of which the moving speed computed in said moving speed computing step is the largest, from the moving-image constituting image extracted in said moving image constituting image extracting step.

Moreover, according to the sixth aspect of the present invention, there is provided an image trimming program for an image trimming apparatus that trims off an image. The program makes the image trimming apparatus function as: a moving image constituting image extracting section that extracts a moving-image constituting image from a moving image having a plurality of moving-image constituting images; a moving speed computing section that computes a moving speed, in the moving image, of an object included in the moving-image constituting image extracted from said moving image constituting image extracting section based on the change of position of the object in the plurality of moving-image constituting images continued following the moving-image constituting image extracted from said moving image constituting image extracting section; and a trimming section that trims off a partial image including an object of which the moving speed computed from said moving speed computing section is the largest, from the moving-image constituting image extracted from said moving image constituting image extracting section.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
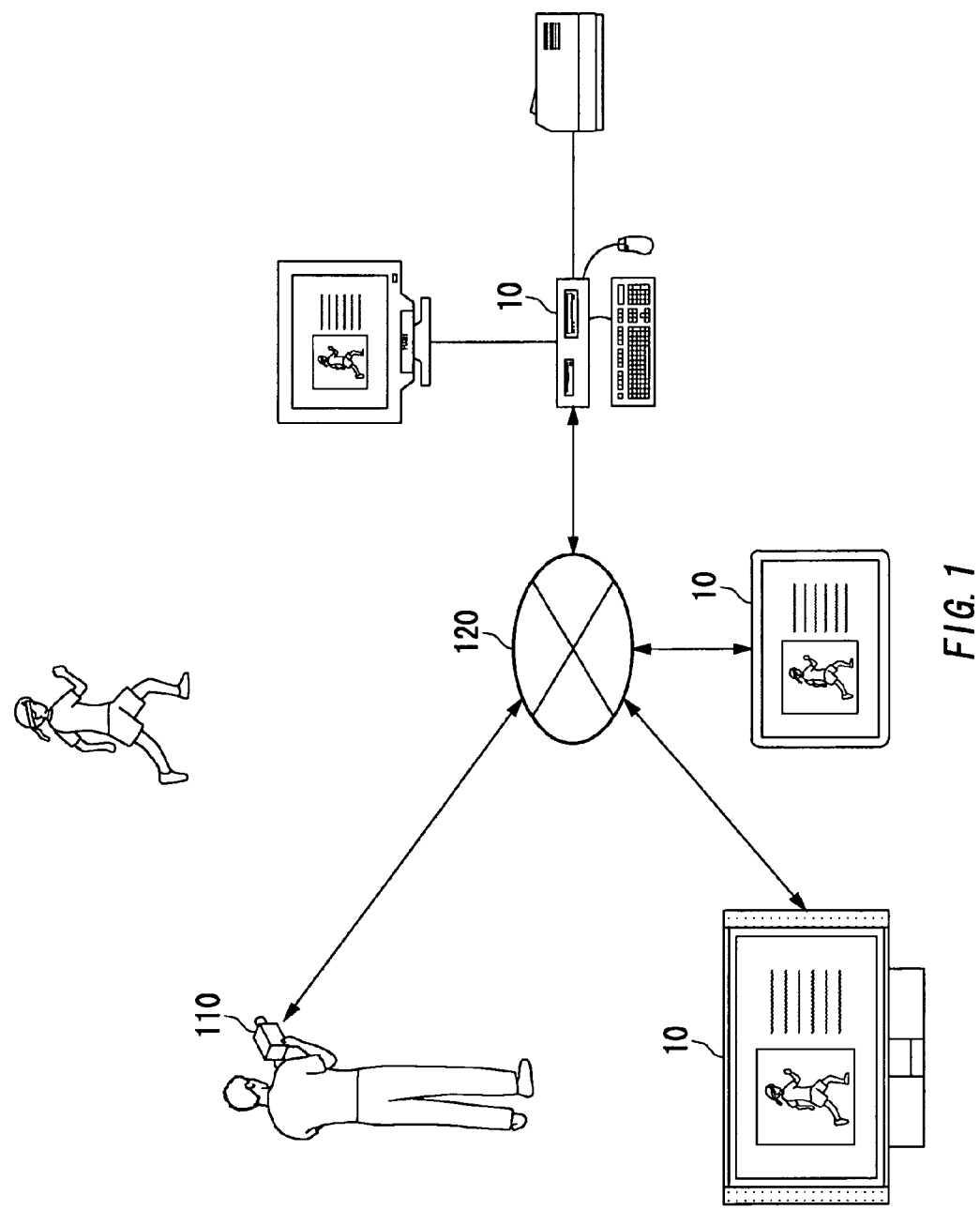
FIG. 1 shows a conceptual diagram of an image output apparatus 10.

FIG. 1 shows a conceptual diagram of an image output apparatus 10 according to an embodiment of the present invention. In addition, the image output apparatus 10 is an example of an image trimming apparatus according to the present invention. The image output apparatus 10 extracts moving-image constituting image(s) from a moving image taken by an image capturing apparatus 110 to lay out the extracted image(s) in an output area, based on a moving direction of an object included in the moving-image constituting image(s). Here, an output area means a display area displaying a moving-image constituting image or a print area printing a moving-image constituting image. Then; the image output apparatus 10 outputs the laid-out moving-image constituting image(s) to the output area. In addition, a moving-image constituting image may be either of a frame image, a field image, or a various types of images constituting other moving images.

For example, the image output apparatus 10 may lay out and display a moving-image constituting image in a display area on a monitor of a personal computer. Moreover, the image output apparatus 10 may be a portable telephone or a personal digital assistant such as a PDA. Moreover, the image output apparatus 10 may lay out a moving-image constituting image in a printing area on printed matter to print the laid-out image by means of a printer. Furthermore, the image output apparatus 10 may be a display apparatus that receives a moving-image constituting image via a network 120 to display the received moving-image constituting image on a TV receiver and a photo stand.

For example, the network 120 maybe Internet or LAN. In addition, the image output apparatus 10 may not only transmit and receive a moving-image constituting image of a captured moving image via the network 120, but also input the moving-image constituting image into the image output apparatus 10 itself via a storage device using, e.g., a magnetic recording medium and a semiconductor recording medium provided in the image capturing apparatus 110. Furthermore, the image output apparatus 10 may input a moving-image constituting image into itself via a radio communication or an optical communication.

An object of the image output apparatus 10 according to the present embodiment is to automatically lay out a moving-image constituting image extracted from a taken moving image based on a moving direction of an object included in the moving-image constituting image so that an appreciator does not experience discomfort for the composition.

Figure 2:
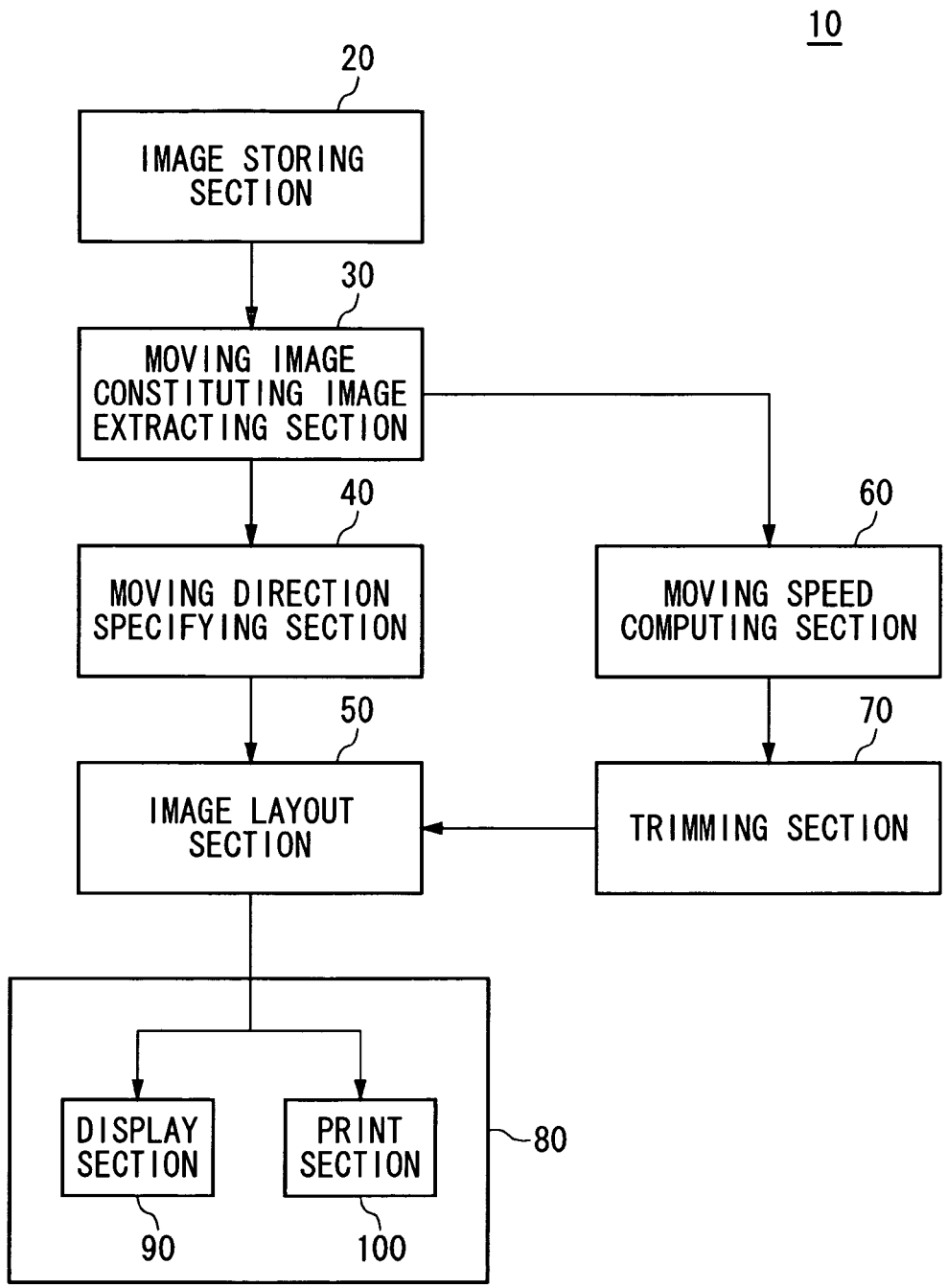
FIG. 2 is a block diagram showing a functional configuration of an image output apparatus 10.

FIG. 2 is a view exemplary showing a functional configuration of the image output apparatus 10 according to the present embodiment. The image output apparatus 10 includes an image storing section 20, a moving image constituting image extracting section 30, a moving direction specifying section 40, an image layout section 50, a moving speed computing section 60, a trimming section 70, and an image outputting section 80. The image outputting section 80 has a display section 90 and a print section 100. The image storing section 20 stores a taken moving image. The image storing section 20 supplies the taken moving image to the moving image constituting image extracting section 30. The moving image constituting image extracting section 30 receives the moving image from the image storing section 20. Then, the moving image constituting image extracting section 30 extracts moving-image constituting image(s) from the moving image having moving-image constituting images.

The moving image constituting image extracting section 30 supplies the extracted moving-image constituting image (s) to the moving direction specifying section 40 and the moving speed computing section 60. The moving direction specifying section 40 receives the moving-image constituting image(s) from the moving image constituting image extracting section 30. The moving direction specifying section 40 specifies a moving direction, in the moving image, of an object included in the extracted moving-image constituting image(s) based on the change of position of the object in the plurality of continued moving-image constituting images. The specification of moving direction may be performed by means of a block matching method and a gradient method. The moving direction specifying section 40 supplies the specified moving direction of object to the image layout section 50.

The moving speed computing section 60 receives the moving-image constituting image(s) from the moving image constituting image extracting section 30. The moving speed computing section 60 computes a moving speed, in the moving image, of the object included in the extracted moving-image constituting image(s) based on the change of position of object and a frame period in a plurality of moving-image constituting images continued following the moving-image constituting image extracted from the moving image constituting image extracting section 30. The moving speed computing section 60 supplies the computed moving speed of object to the trimming section 70.

The trimming section 70 receives the moving speed of object computed from the moving speed computing section 60. Then, the trimming section 70 trims off a partial image including an object of which the computed moving speed is larger than a predetermined reference speed. In addition, a reference speed may be freely set by an image capturing person or the like. The trimming section 70 supplies the trimmed partial image to the image layout section 50.

The image layout section 50 receives the moving direction of object specified by the moving direction specifying section 40 from the moving direction specifying section 40. Moreover, the image layout section 50 may receive the partial image trimmed by the trimming section 70. The image layout section 50 lays out the extracted moving-image constituting image(s) in an output area based on the moving direction of object specified by the moving direction specifying section 40. The image layout section 50 supplies the laid-out moving-image constituting image(s) to the image outputting section 80.

The image outputting section 80 receives the laid-out moving-image constituting image(s) from the image layout section 50. Then, the image outputting section 80 outputs the laid-out moving-image constituting image(s) to the output area. Moreover, the display section 90 displays the laid-out moving-image constituting image(s). Furthermore, the print section 100 prints the laid-out moving-image constituting image(s) on the output area.

According to the image output apparatus 10 of the present embodiment, it is possible to extract moving-image constituting image(s) from a moving image to automatically lay out the moving-image constituting image(s) based on a moving direction of an object included in the moving-image constituting image(s). In this way, it is possible to output moving-image constituting images of which layout looks well and at which an appreciator does not sense a discomfort without a special operation of the appreciator.

Figure 3:
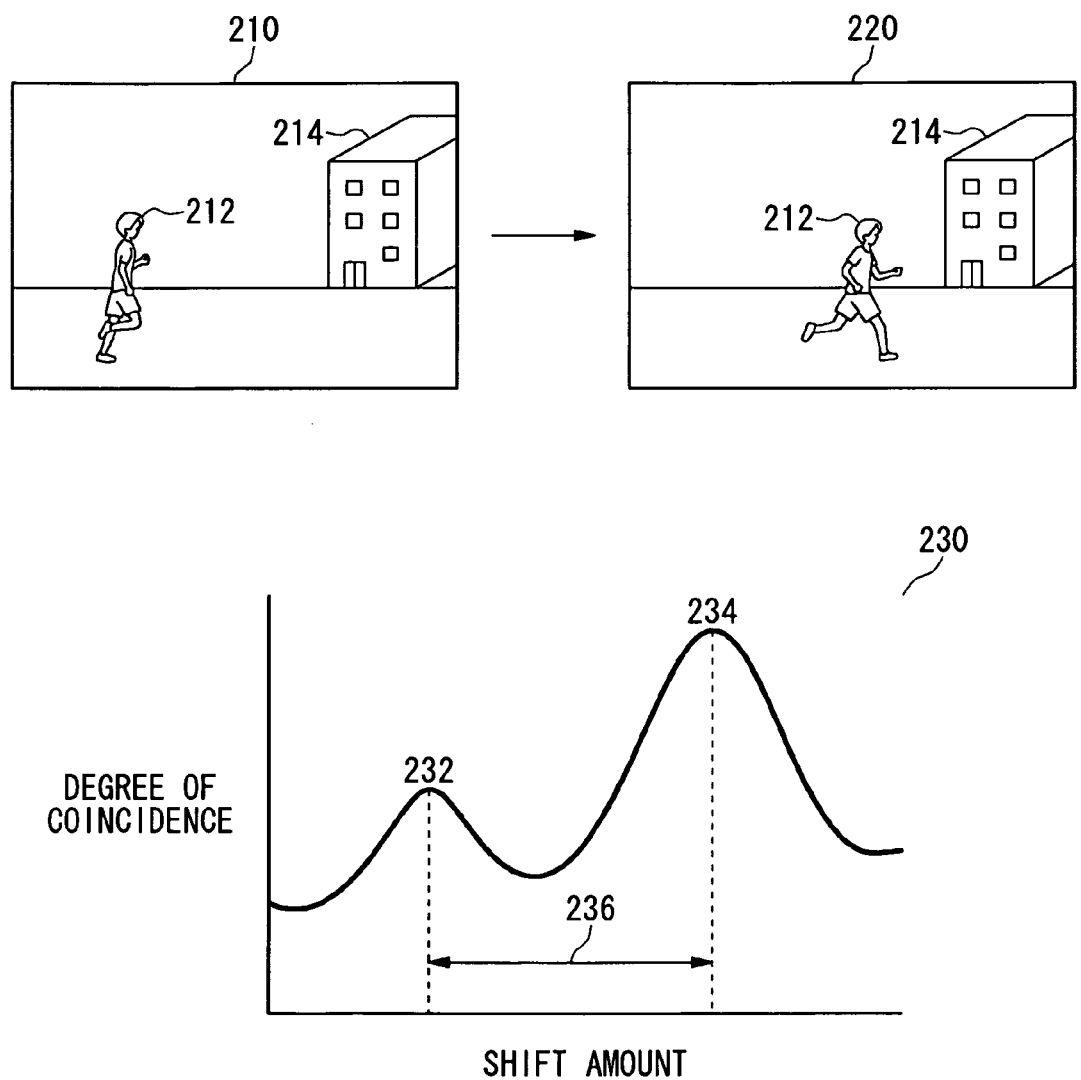
FIG. 3 is a view showing a moving speed computation method in a moving speed computing section 60.

FIG. 3 is a view exemplary showing a computing method of a moving speed by the moving speed computing section 60. The moving speed computing section 60 overlaps and matches a plurality of moving-image constituting images continued following the moving-image constituting image extracted from the moving image constituting image extracting section 30 while changing a shift amount. Then, the moving speed computing section 60 computes a degree of coincidence between the moving-image constituting images every predetermined shift amount. Here, a shift amount shows an amount by which the moving-image constituting images are overlapped with each other. An appreciator may freely set a shift amount. Moreover, a degree of coincidence shows a ratio of a matched area of a background and an object in the moving-image constituting images to an area of the overlapped moving-image constituting images.

Then, the moving speed computing section 60 overlaps and matches moving-image constituting images while shifting the moving-image constituting images from an end of a moving-image constituting image 210 to a longitudinal direction of a moving-image constituting image 220. Then, the moving speed computing section 60 judges that a peak 234 having the greatest degree of coincidence is a point where a background of the moving-image constituting image 210 is identical with a background of the moving-image constituting image 220, in a graph 230. Since a ratio of an area occupied by a background to a moving-image constituting image is usually the largest, a degree of coincidence between moving-image constituting images may be the largest when backgrounds are identical with each other.

Moreover, the moving speed computing section 60 judges that another peak, except the peak where a degree of coincidence becomes the largest, is a peak showing a point where objects included in the moving-image constituting image 210 and the moving-image constituting image 220 are identical with each other. Because an area ratio of an object included in a moving-image constituting image to the moving-image constituting image is usually smaller than an area ratio of a background to the moving-image constituting image, it is judged that other peaks, except a peak having the maximum degree of coincidence, are peaks showing points where objects are identical with each other.

Then, it is assumed that the difference between the position of point where the backgrounds are identical with each other and the position of point where the objects are identical with each other, which are judged by the moving speed computing section 60, is a distance 236 of object to the background. In this way, a moving speed of the object can be computed based on a frame period and the computed distance 236 of object to the background.

In addition, a direction for matching moving-image constituting images while shifting the moving-image constituting images is not limited to the direction described above. The moving speed computing section 60 may shift and match the moving-image constituting images for each predetermined shift amount along a longitudinal direction or a transverse direction of the moving-image constituting image. Moreover, the moving speed computing section 60 may simultaneously change a predetermined shift amount in a longitudinal direction and a transverse direction, in order to shift and match the moving-image constituting images.

Moreover, in another example, the moving speed computing section 60 may superimpose a plurality of moving-image constituting images continued following the extracted moving-image constituting image to match the moving-image constituting images. The moving speed computing section 60 may extract an area not matched in a matching operation as a moving object. Then, the moving speed computing section 60 may compute a moving speed of the extracted object based on a frame period and a moving distance of the object.

Figure 4:
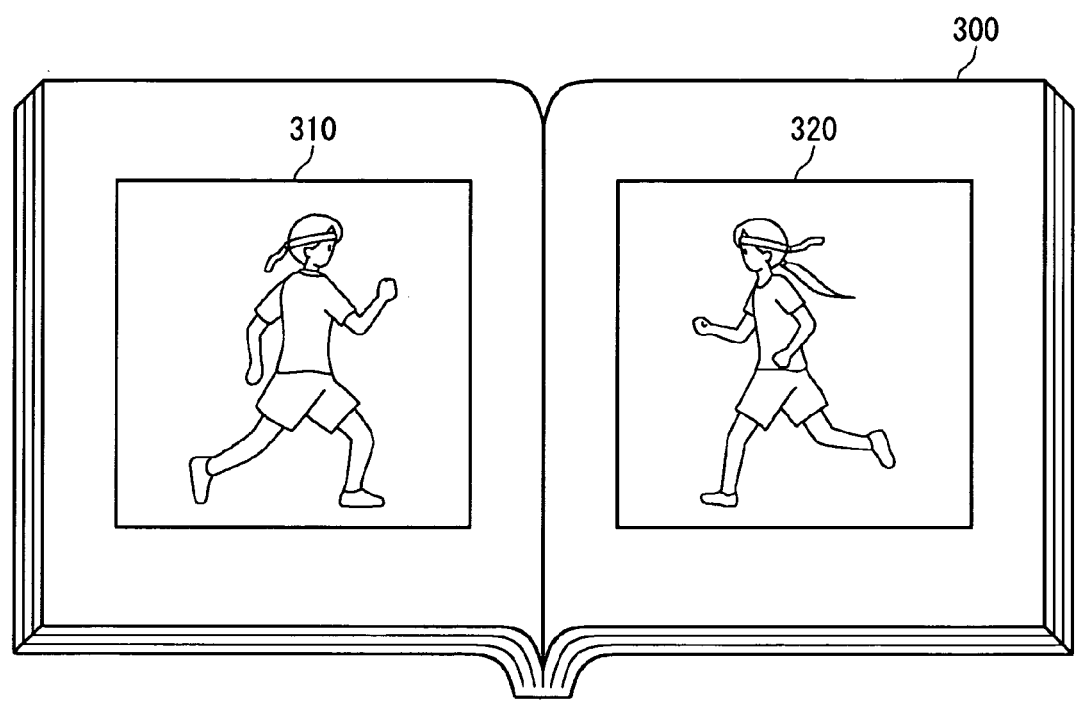
FIG. 4 is a view showing a layout of images in an image layout section 50.

FIG. 4 is a view exemplary showing a layout of images in an output area according to the present embodiment. The image layout section 50 lays out moving-image constituting images in the output area so that the moving direction of object specified by the moving direction specifying section 40 faces a center of the output area. For example, the image layout section 50 may lay out moving-image constituting images so that moving directions of figures included in a moving-image constituting image 310 and a moving-image constituting image 320 face a center of a spread page of an album 300.

Figure 5:
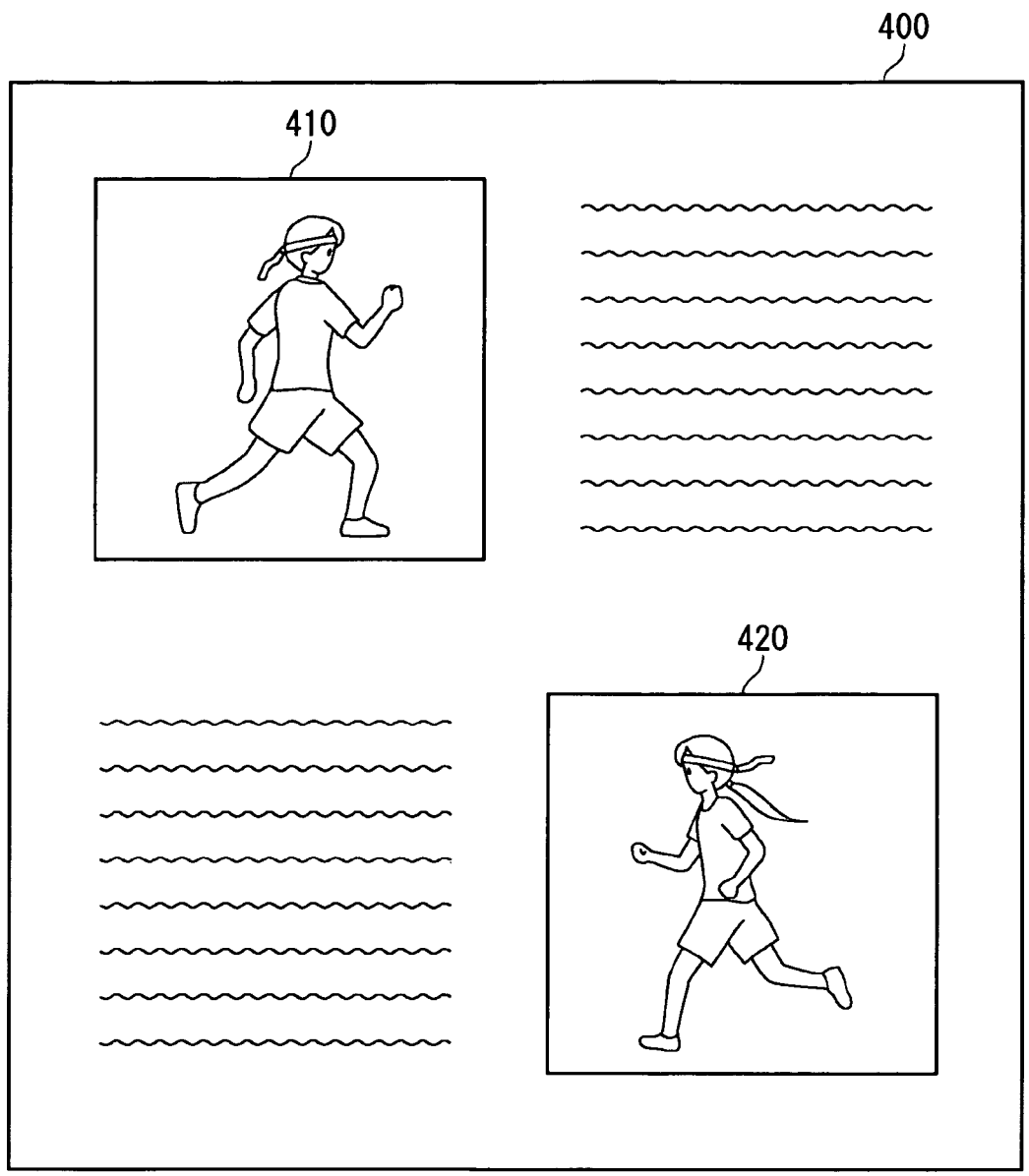
FIG. 5 is a view showing a layout of images in an image layout section 50.

FIG. 5 is a view exemplary showing a layout of images in an output area according to the present embodiment. The image layout section 50 may lay out moving-image constituting images so that moving directions of objects included in a moving-image constituting image 410 and a moving-image constituting image 420 face a center of page space 400.

Figure 6:
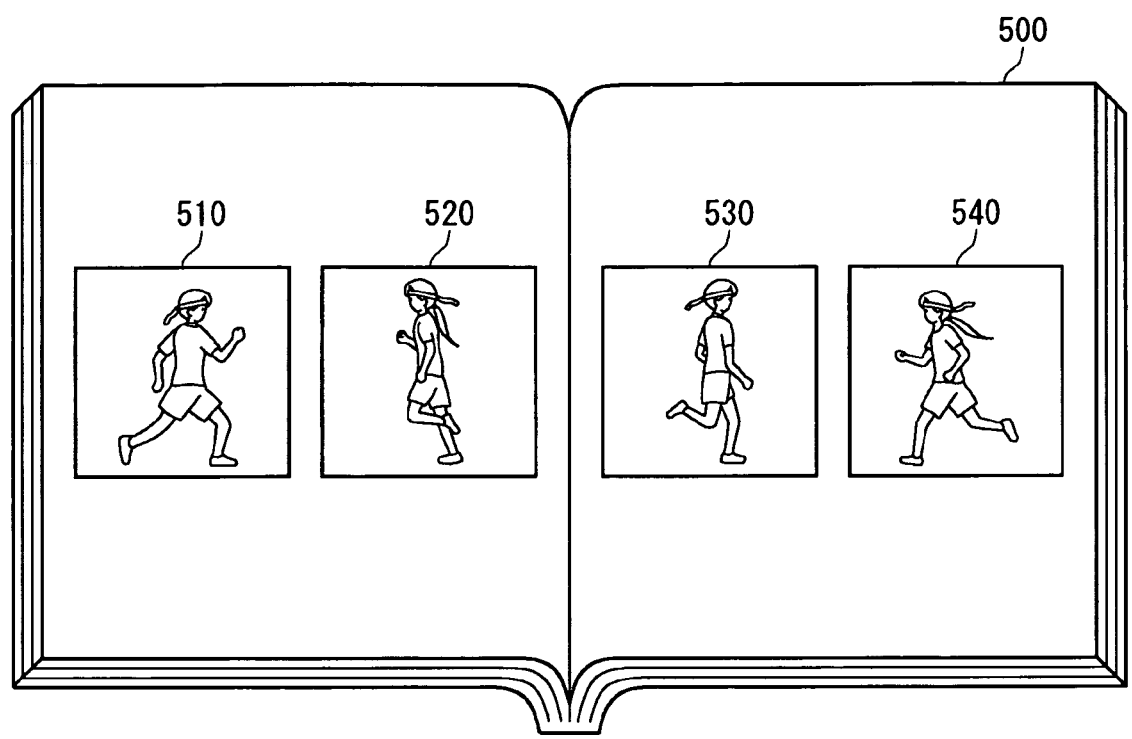
FIG. 6 is a view showing a layout of images in an image layout section 50.

FIG. 6 is a view exemplary showing a layout of images in an output area according to the present embodiment. The image layout section 50 may lay out moving-image constituting images so that moving directions of objects included in a moving-image constituting image 510, a moving-image constituting image 520, a moving-image constituting image 530, and a moving-image constituting image 540 face a center of each page of an album 500.

Figure 7:
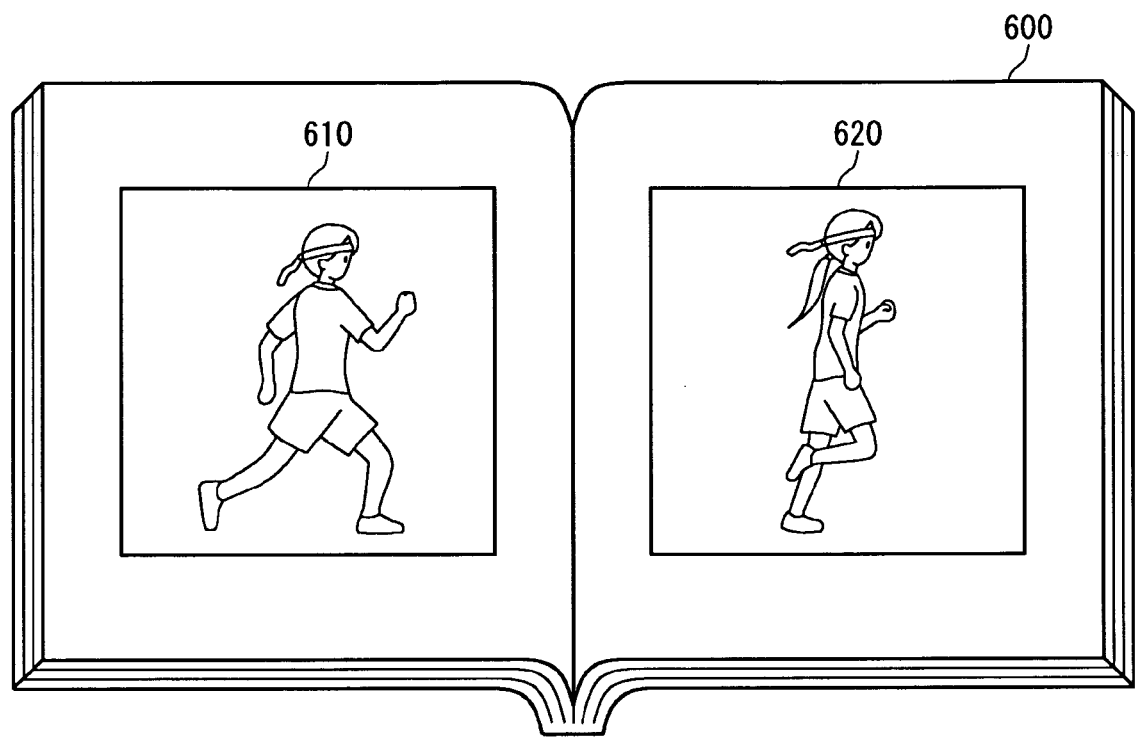
FIG. 7 is a view showing a layout of images in an image layout section 50.

FIG. 7 is a view exemplary showing a layout of images in an output area according to the present embodiment. The image layout section 50 may lay out moving-image constituting images so that moving directions of objects included in a moving-image constituting image 610 and a moving-image constituting image 620 face the next page in an album 600.

Figure 8:
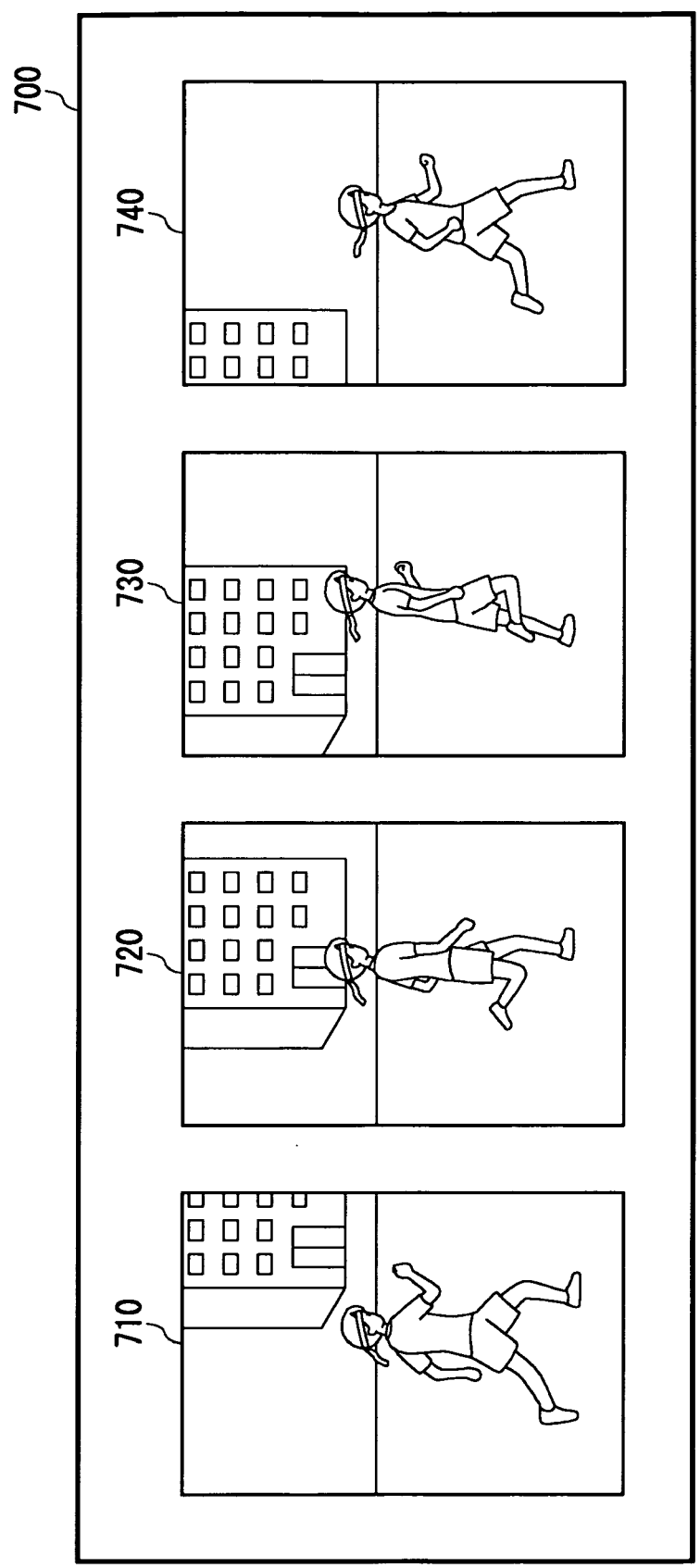
FIG. 8 is a view showing a layout of images in an image layout section 50.

FIG. 8 is a view exemplary showing a layout of images in an output area according to the present embodiment. The image layout section 50 may lay out a plurality of moving-image constituting images extracted from the moving image constituting image extracting section 30 along moving directions of objects in time series. For example, when a moving-image constituting image 710 is first taken and a moving-image constituting image 740 is last taken, the image layout section 50 may lay out the images in order of the moving-image constituting image 710, a moving-image constituting image 720, a moving-image constituting image 730, and the moving-image constituting image 740 in an output area 700. Moreover, the image layout section 50 may lay out the moving-image constituting images so as to face the next page in an album when laying out the moving-image constituting images in the album.

Figure 9:
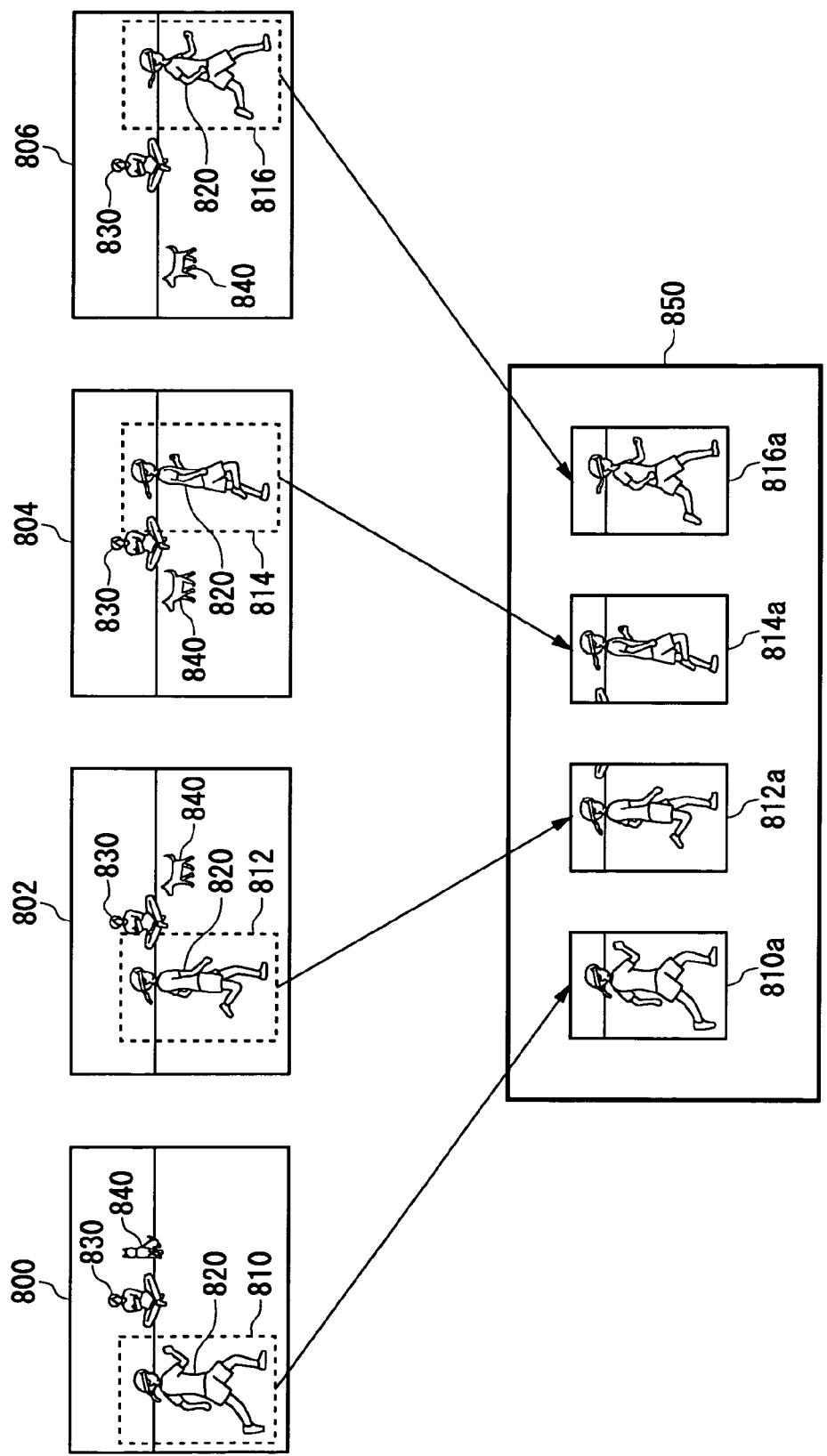
FIG. 9 is a view showing a process performed in a trimming section 70 and an image layout section 50.

FIG. 9 is a view exemplary showing a trimming method by the trimming section 70 and a layout of images by the image layout section 50 according to the present embodiment. The trimming section 70 may trim off a partial image including an object of which the moving speed computed from the moving speed computing section 60 is the largest from the moving-image constituting images extracted from the moving image constituting image extracting section 30. For example, in a moving-image constituting image 800, the trimming section 70 may trim off a partial image 810 including a subject 820 when an object of which the moving speed computed from the moving speed computing section 60 is the largest is the subject 820.

Moreover, the trimming section 70 may trim off partial images including an object having the largest area in a moving-image constituting image among objects, of which the computed moving speed is larger than a predetermined reference speed, from the extracted moving-image constituting images. For example, in a moving-image constituting image 802, the trimming section 70 may trim off a partial image 812 including a subject 820 of which an area is the largest in the moving-image constituting image 802 when objects having a moving speed larger than the predetermined reference speed are the subject 820 and a subject 840.

Then, the trimming section 70 supplies the trimmed partial image to the image layout section 50. The image layout section 50 receives the trimmed partial image. Then, the image layout section 50 may lay out the trimmed partial image received from the image layout section 50 in an output area based on a moving direction of an object included in the partial image. For example, the image layout section 50 may lay out partial images 810a to 816a in an output area 850 based on a moving direction of each object included in the partial images.

According to the image output apparatus 10 of the present embodiment, it is possible to lay out the extracted moving-image constituting images based on a moving direction of each object included in the moving-image constituting images. Moreover, it is possible to trim off and lay out a partial image from a moving-image constituting image based on a moving speed of an object included in the moving-image constituting image. In this way, it is possible to output an image made by automatically laying out a moving-image constituting image and a partial image, at which an appreciator does not sense a discomfort, without a special operation of the appreciator.

Figure 10:
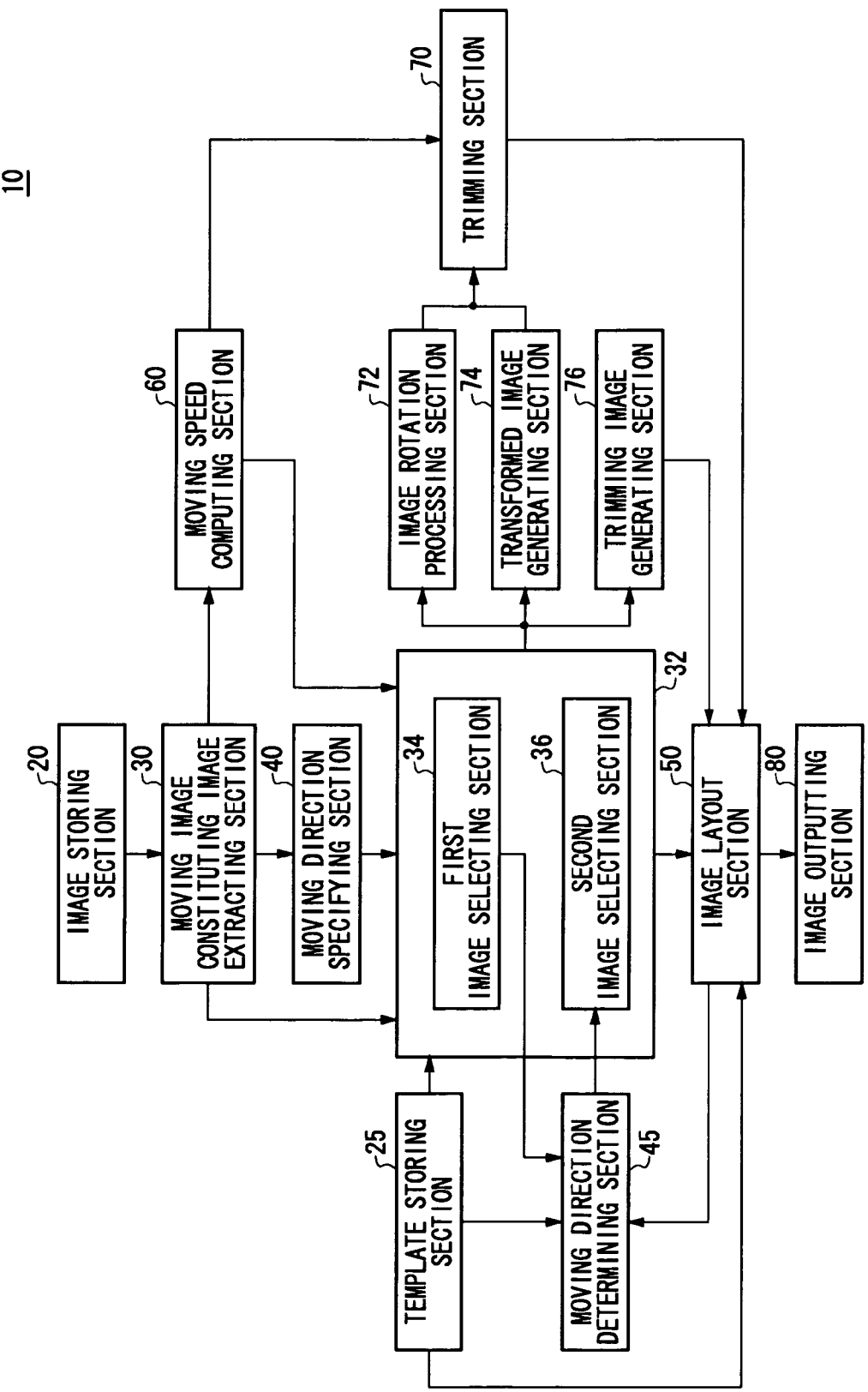
FIG. 10 is a block diagram showing a functional configuration of an image output apparatus 10.

FIG. 10 is a view exemplary showing a functional configuration of an image output apparatus 10 according to another embodiment of the present invention. The image output apparatus 10 includes a template storing section 25, a moving image constituting image extracting section 30, an image selecting section 32, a first image selecting section 34, a second image selecting section 36, a moving direction determining section 45, an image rotation processing section 72, a transformed image generating section 74, and a trimming image generating section 76. In addition, the image output apparatus 10 according to the present embodiment may further include a part or the whole of a configuration and a function of the image output apparatus 10 described in reference to FIGS. 1 to 9.

The template storing section 25 stores a template of an output area for which an image arrangement position that is a position for arranging a moving-image constituting image and a moving direction of an object included in the moving-image constituting image to be arranged at the image arrangement position are predetermined. At least one image arrangement position may be determined for the template stored on the template storing section 25, and an image arrangement frame that is a frame for arranging the moving-image constituting image may be associated with the image arrangement position. Moreover, the template storing section 25 may store a template of an output area for which a first image arrangement position, at which a first moving-image constituting image should be arranged, and a second image arrangement position, at which a second moving-image constituting image should be arranged, are predetermined. Then, the template storing section 25 may store a template of an output area for which the second image arrangement position and a moving direction of an object relative to a moving direction of an object included in the first moving-image constituting image are predetermined.

Here, composition information may be associated with the image arrangement position included in the template stored on the template storing section 25. Composition information may be information showing a special feature of a moving-image constituting image to be arranged at the image arrangement position. For example, composition information may be a name of an object included in a moving-image constituting image, a moving speed of an object included in a moving-image constituting image, and a position, in a moving-image constituting image, of a main object included in the moving-image constituting image, and a moving direction of an object included in a moving-image constituting image is an example of composition information. The template storing section 25 supplies composition information associated with the image arrangement position included in the template to the image selecting section 32 based on the control of the image selecting section 32. Moreover, the template storing section 25 supplies the template to the image layout section 50 based on the control of the image layout section 50.

The moving image constituting image extracting section 30 extracts moving-image constituting image(s) from a moving image received from the image storing section 20. Moreover, the moving image constituting image extracting section 30 may store the extracted moving-image constituting image(s) on the image storing section 20 in association with composition information. The moving image constituting image extracting section 30 supplies the moving-image constituting image(s) to the image selecting section 32 based on the control of the image selecting section 32. The moving direction specifying section 40 specifies a moving direction, in a moving-image constituting image, of an object included in the moving-image constituting image, in order to store the specified moving direction of object on the image storing section 20 in association with the moving-image constituting image. The moving direction specifying section 40 may store the specified moving direction of object on the image storing section 20 via the moving image constituting image extracting section 30 in association with the moving-image constituting image. The moving direction specifying section 40 supplies the specified moving direction of object to the image selecting section 32. Moreover, the moving speed computing section 60 supplies the computed moving speed of object to the image selecting section 32.

The image selecting section 32 selects a moving-image constituting image, which is associated with composition information associated with the image arrangement position included in the template stored on the template storing section 25, from the moving-image constituting images extracted from the moving image constituting image extracting section 30. Specifically, the image selecting section 32 receives the composition information associated with the image arrangement position included in the template from the template storing section 25. More specifically, the image selecting section 32 receives the moving direction of object included in the composition information from the template storing section 25. Then, the image selecting section 32 selects a moving-image constituting image, in which the moving direction of object received from the template storing section 25 and the moving direction of object specified by the moving direction specifying section 40 are identical with each other, from the moving-image constituting images extracted from the moving image constituting image extracting section 30. Moreover, the image selecting section 32 may select a moving-image constituting image existing in the moving direction of object specified by the moving direction specifying section 40, in which the size of area is larger than the size of area within a moving-image constituting image existing in a direction opposite to the moving direction specified by the moving direction specifying section 40, from the plurality of continued moving-image constituting images. Moreover, when the moving speed of object computed from the moving speed computing section 60 is larger, the image selecting section 32 may select a moving-image constituting image existing in the moving direction of object specified by the moving direction specifying section 40, in which the size of area is larger.

Furthermore, the image selecting section 32 may have the first image selecting section 34 and the second image selecting section 36. The first image selecting section 34 selects a first moving-image constituting image to be arranged at a first image arrangement position. A main image is an example of the first moving-image constituting image. A main image means a moving-image constituting image that gives the strongest impression to an appreciator in a page of an album. For example, a main image may be a moving-image constituting image including a chief character of an album. Moreover, a main image may be a moving-image constituting image emphasized most among a plurality of moving-image constituting images arranged in a page. Specifically, a main image may be a moving-image constituting image arranged at the front and a moving-image constituting image arranged at the most middle position compared to other moving-image constituting images. Besides, a main image may be a moving-image constituting image of which a periphery is emphasized with a frame or a moving-image constituting image in which a visual effect is performed on a subject. Moreover, the second moving-image constituting image according to the present embodiment may be a sub image. Here, a sub image may be a moving-image constituting image including a subject except a chief character of an album. Moreover, a sub image may be a moving-image constituting image that is smaller than a main image and is arranged away from the center of page in the album. Then, the second image selecting section 36 selects the second moving-image constituting image including an object that moves to a moving direction determined by the moving direction determining section 45 to be described below. Specifically, the second image selecting section 36 selects a moving-image constituting image including an object that moves to a moving direction determined by the moving direction determining section 45 from the moving-image constituting images extracted from the moving image constituting image extracting section 30. The image selecting section 32, the first image selecting section 34, and the second image selecting section 36 supply the selected moving-image constituting image to the trimming image generating section 76, the image rotation processing section 72, or the transformed image generating section 74.

The moving direction determining section 45 determines a moving direction of an object included in the second moving-image constituting image to be arranged at the second image arrangement position according to the moving direction of object included in the first moving-image constituting image selected by the first image selecting section 34. Specifically, the moving direction specifying section 40 determines a moving direction of an object included in the second moving-image constituting image to be arranged at the second image arrangement position, based on the moving direction of object included in the first moving-image constituting image selected by the first image selecting section 34 and the relative moving direction of object included in composition information of an image arrangement position of the template stored on the template storing section 25. For example, in order to arrange a moving-image constituting image including an object, which moves to the same direction as the moving direction of object included in the first moving-image constituting image, at the second image arrangement position, the moving direction determining section 45 may determine a moving direction of an object included in the second moving-image constituting image to be arranged at the second image arrangement position to the same direction as the moving direction of object included in the first moving-image constituting image. Moreover, the moving direction determining section 45 may determine a moving direction of an object included in the second moving-image constituting image to be arranged at the second image arrangement position to a direction different from the moving direction of object included in the first moving-image constituting image. Furthermore, the moving direction determining section 45 may independently determine a moving direction for each of the image arrangement positions when the template includes a plurality of image arrangement positions. The moving direction determining section 45 supplies the determined moving direction to the second image selecting section 36.

The trimming image generating section 76 trims off an object included in a moving-image constituting image received from the image selecting section 32 to generate a trimming image so that the size of area within the moving-image constituting image existing in the moving direction of object specified by the moving direction specifying section 40 becomes larger than the size of area within a moving-image constituting image existing in a direction opposite to the moving direction of object specified by the moving direction specifying section 40. Moreover, when the moving speed of object computed from the moving speed computing section 60 is larger, the trimming image generating section 76 may trim off an object included in a moving-image constituting image to generate a trimming image so that the size of area within a moving-image constituting image existing in the moving direction of object specified by the moving direction specifying section 40 becomes larger than the size of area within a moving-image constituting image existing in a direction opposite to the moving direction specified by the moving direction specifying section 40. The trimming image generating section 76 supplies the generated trimming image to the image layout section 50.

When the image selecting section 32 judges that there is not a moving-image constituting image in which the moving direction of object specified by the moving direction specifying section 40 and a moving direction associated with an image arrangement position included in the template stored on the template storing section 25 are identical with each other, the image rotation processing section 72 receives the moving direction of object and the moving-image constituting image extracted from the moving image constituting image extracting section 30, from the image selecting section 32. Then, the image rotation processing section 72 rotates the received moving-image constituting image along a horizontal direction on a surface of the moving-image constituting image so that the moving direction received from the image selecting section 32 and the moving direction associated with the image arrangement position of the template stored on the template storing section 25 are identical with each other. The image rotation processing section 72 supplies the rotated moving-image constituting image to the trimming section 70.

When the image selecting section 32 judges that there is not a moving-image constituting image in which the moving direction of object specified by the moving direction specifying section 40 and the moving direction of object associated with an image arrangement position included in the template stored on the template storing section 25 are identical with each other, the transformed image generating section 74 receives the moving direction of the object and the moving-image constituting image extracted from the moving image constituting image extracting section 30, from the image selecting section 32. Then, the transformed image generating section 74 generates an image made by performing geometric transformation on the moving-image constituting image so that the moving direction of object received from the image selecting section 32 and the moving direction of object associated with the image arrangement position of the template stored on the template storing section 25 are identical with each other. For example, the transformed image generating section 74 may transform the received moving-image constituting image into a parallelogram or the like, in order to harmonize the moving direction of object associated with the image arrangement position of the template with the moving direction of object specified by the moving direction specifying section 40. The transformed image generating section 74 supplies the image made by transforming the moving-image constituting image to the trimming section 70.

The trimming section 70 trims off the image received from the transformed image generating section 74 and the image rotation processing section 72 in the shape of image arrangement frame of the image arrangement position. The trimming section 70 supplies the trimmed image to the image layout section 50. The image layout section 50 receives a template from the template storing section 25. Then, the image layout section 50 lays out the trimming image received from the trimming image generating section 76 and the trimmed image received from the trimming section 70 at the image arrangement position in the template. Moreover, the image layout section 50 may receive the image generated from the transformed image generating section 74 via the trimming section 70, and lay out the received image at the image arrangement position in the template.

Moreover, the image layout section 50 lays out the first moving-image constituting image selected by the first image selecting section 34 at the first image arrangement position. Subsequently, when the image layout section 50 lays out the first moving-image constituting image at the first image arrangement position, the image layout section 50 supplies the moving direction of object included in the first moving-image constituting image to the moving direction determining section 45. The moving direction determining section 45 may determine a moving direction of an object included in the second moving-image constituting image to be arranged at the second image arrangement position according to the moving direction of object included in the first moving-image constituting image received from the image layout section 50. Then, the image layout section 50 lays out the second moving-image constituting image selected by the second image selecting section 36 at the second image arrangement position. The image layout section 50 supplies the laid-out moving-image constituting image to the image outputting section 80. The image outputting section 80 may cause the print section 100 to print the laid-out moving-image constituting image on a paper medium to output the printed images as an album. Moreover, the image outputting section 80 may record the laid-out moving-image constituting image in a recording medium such as a DVD.

According to the image output apparatus 10 of the present embodiment, since composition information is previously associated with an image arrangement position included in a template, it is possible to automatically select a moving-image constituting image identical with composition information to lay out the selected moving-image constituting image at the image arrangement position. In this way, it is possible to omit time and trouble for selecting and laying out a moving-image constituting image suitable for an image arrangement position from a lot of moving-image constituting images.

Figure 11:
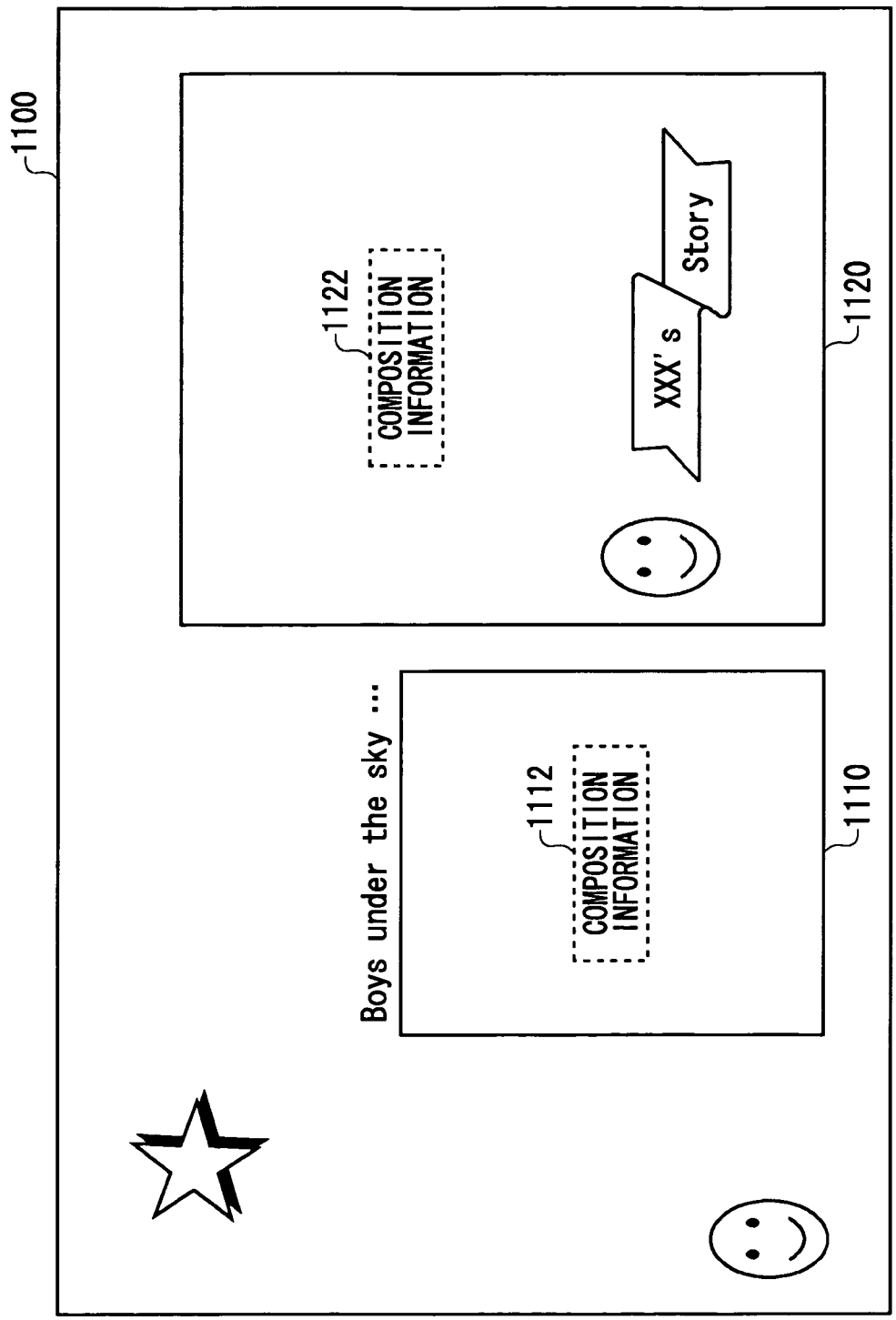
FIG. 11 is a view showing a template 1100.

FIG. 11 is a view exemplary showing a template 1100 stored on the template storing section 25 according to the present embodiment. The template storing section 25 stores a template of an output area for which an image arrangement position and composition information of a moving-image constituting image to be arranged at the image arrangement position are predetermined. In addition, the image arrangement position may correspond to an image arrangement frame in which a moving-image constituting image should be arranged. A plurality of image arrangement positions may be included in one output area. Moreover, an image arrangement frame corresponding to an image arrangement position may be a shape such as a generally circular shape, a generally polygonal shape, and a shape of an object included in a moving-image constituting image. Furthermore, the template storing section 25 may store a template of an output area for which the first image arrangement position at which the first moving-image constituting image should be arranged and the second image arrangement position at which the second moving-image constituting image should be arranged are predetermined, or may store a template of an output area for which the second image arrangement position and the moving direction of object relative to the moving direction of object included in the first moving-image constituting image are predetermined.

Here, composition information may be an object name and a figure name included in a moving-image constituting image, the cast of the figure (information that the figure is a chief character in the album according to a class of an album), information showing a position of the chief character in the moving-image constituting image, a moving direction of object, a moving speed of object, acceleration of object, a birthday of the figure included in the moving-image constituting image, image capturing date and time and an image capturing place when taking the moving-image constituting image, and information showing a special feature of the moving-image constituting image to be arranged at the image arrangement position. Moreover, a template may be a template on a page in an album. Then, a page on an album may be a cover, a spread page, and one page of spread pages.

For example, an image arrangement frame 1110 and an image arrangement frame 1120 are included in the template 1100. Then, composition information 1112 is associated with the image arrangement frame 1110 and composition information 1122 is associated with the image arrangement frame 1120. In this case, the image selecting section 32 extracts, e.g., the composition information 1122 associated with the image arrangement frame 1120 to select a moving-image constituting image associated with information identical with the composition information 1122 from the moving-image constituting images extracted from the moving image constituting image extracting section 30. For example, when information related to the moving direction of object is associated with the composition information 1122, the image selecting section 32 selects a moving-image constituting image, which is associated with information identical with the information related to the moving direction, from the moving-image constituting images extracted from the moving image constituting image extracting section 30. Then, the image layout section 50 lays out the moving-image constituting image selected by the image selecting section 32 in the image arrangement frame 1120.

Figure 12:
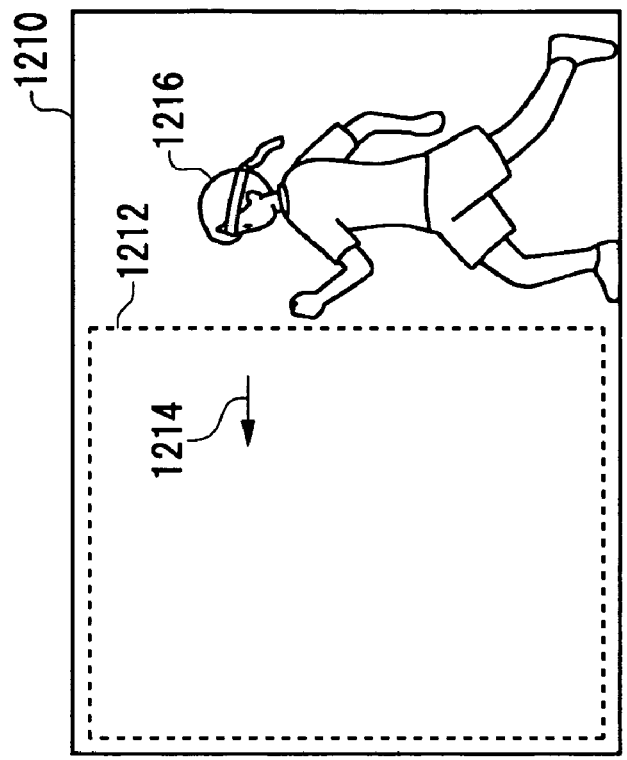
FIG. 12 is a view showing a process performed in an image selecting section 32 and a trimming image generating section 76.
Figure 12:
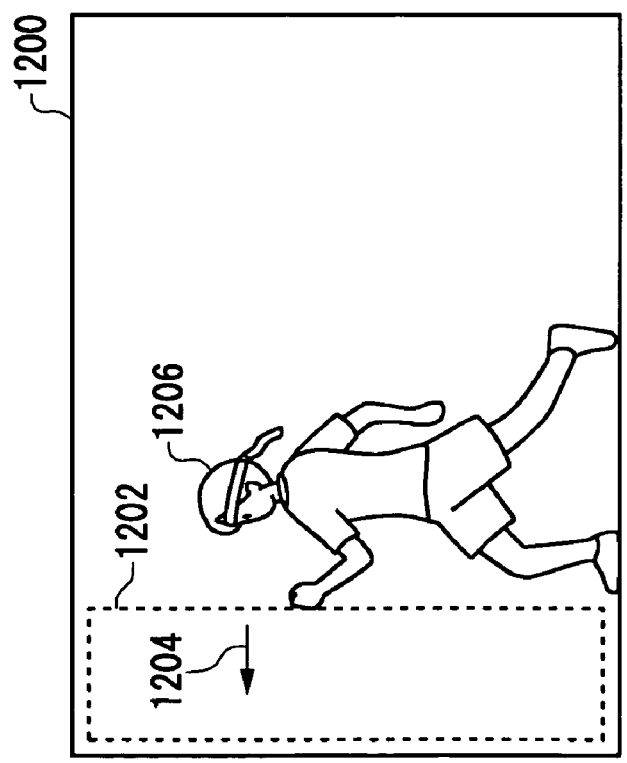

FIG. 12 is a view exemplary showing a process of the image selecting section 32 and the trimming image generating section 76 according to the present embodiment. The image selecting section 32 selects a moving-image constituting image in which the size of area within the moving-image constituting image existing in the moving direction of object specified by the moving direction specifying section 40 is larger than the size of area within a moving-image constituting image existing in a direction opposite to the moving direction specified by the moving direction specifying section 40. In addition, the image selecting section 32 may select a moving-image constituting image, of which the size of area existing in the moving direction of object is large, from a plurality of moving-image constituting images continued following the moving-image constituting image including the object of which the moving direction has been specified. For example, there is considered a moving-image constituting image 1200 including a FIG. 1206 and a moving-image constituting image 1210 including a FIG. 1216. In this case, a moving direction of the FIG. 1206 is a direction as shown by an arrow 1204 and a moving direction of the FIG. 1216 is a direction as shown by an arrow 1214, which are specified by the moving direction specifying section 40.

In this case, the image selecting section 32 selects a moving-image constituting image in which the size of area in the moving direction of figure is larger than the size of area in a direction opposite to the moving direction of figure. That is, in the moving-image constituting image 1200, the size of an area 1202 in the moving direction of the FIG. 1206 is smaller than the size of area in a direction opposite to the moving direction of the FIG. 1206. On the other hand, in the moving-image constituting image 1210, the size of an area 1212 in the moving direction of the FIG. 1216 is larger than the size of area in a direction opposite to the moving direction of the FIG. 1216. Therefore, in this case, the image selecting section 32 selects the moving-image constituting image 1210 to supply it to the image layout section 50.

Moreover, the trimming image generating section 76 may trim off an object included in the moving-image constituting image received from the image selecting section 32 so that the size of area within a moving-image constituting image existing in the moving direction of object specified by the moving direction specifying section 40 becomes larger than the size of area existing in a direction opposite to the moving direction of object specified by the moving direction specifying section 40. For example, it is considered that a moving-image constituting image received by the trimming image generating section 76 from the image selecting section 32 is the moving-image constituting image 1200. In this case, a moving direction of the FIG. 1206 included in the moving-image constituting image 1200 is a direction of the arrow 1204, and the size of area within the moving-image constituting image 1200 existing in the moving direction is smaller than the size of area within the moving-image constituting image 1200 existing in a direction opposite to the moving direction. Therefore, in this case, the trimming image generating section 76 trims off the FIG. 1206 so that the size of area within the moving-image constituting image 1200 in the moving direction of the FIG. 1206 becomes larger than the size of area within the moving-image constituting image 1200 in a direction opposite to the moving direction. For example, the trimming image generating section 76 may trim off the FIG. 1206 so as to have an arrangement shown in the moving-image constituting image 1210.

Furthermore, when the moving speed of object computed from the moving speed computing section 60 is larger, the trimming image generating section 76 may trim off an object included in a moving-image constituting image to generate a trimming image so that the size of area within a moving-image constituting image existing in the moving direction of object specified by the moving direction specifying section 40 becomes larger than the size of area within the moving-image constituting image existing in a direction opposite to the moving direction specified by the moving direction specifying section 40. For example, when the moving speed of FIG. 1206 included in the moving-image constituting image 1200 is larger than the moving speed of FIG. 1216 included in the moving-image constituting image 1210, the trimming image generating section 76 may trim off the FIG. 1206 so that the size of area 1202 within the moving-image constituting image 1200 existing in the moving direction as shown by the arrow 1204 of the FIG. 1206 becomes larger than the size of area within the moving-image constituting image 1200 existing in a direction opposite to the moving direction as shown by the arrow 1204 of the FIG. 1206.

According to the image output apparatus 10 of the present embodiment, the image selecting section 32 can automatically select a moving-image constituting image in which the size of area within the moving-image constituting image existing in the moving direction of object is larger than the size of area within the moving-image constituting image existing in a direction opposite to the moving direction of object. Moreover, when the image selecting section 32 cannot select such a moving-image constituting image, the trimming image generating section 76 can automatically generate a moving-image constituting image in which the size of area within the moving-image constituting image existing in the moving direction of object is larger than the size of area within the moving-image constituting image existing in a direction opposite to the moving direction of object. In this way, since wide space can be arranged in the moving direction of object, an appreciator can appreciate an album in which the moving-image constituting image is laid out without feeling discomfort.

Figure 13:
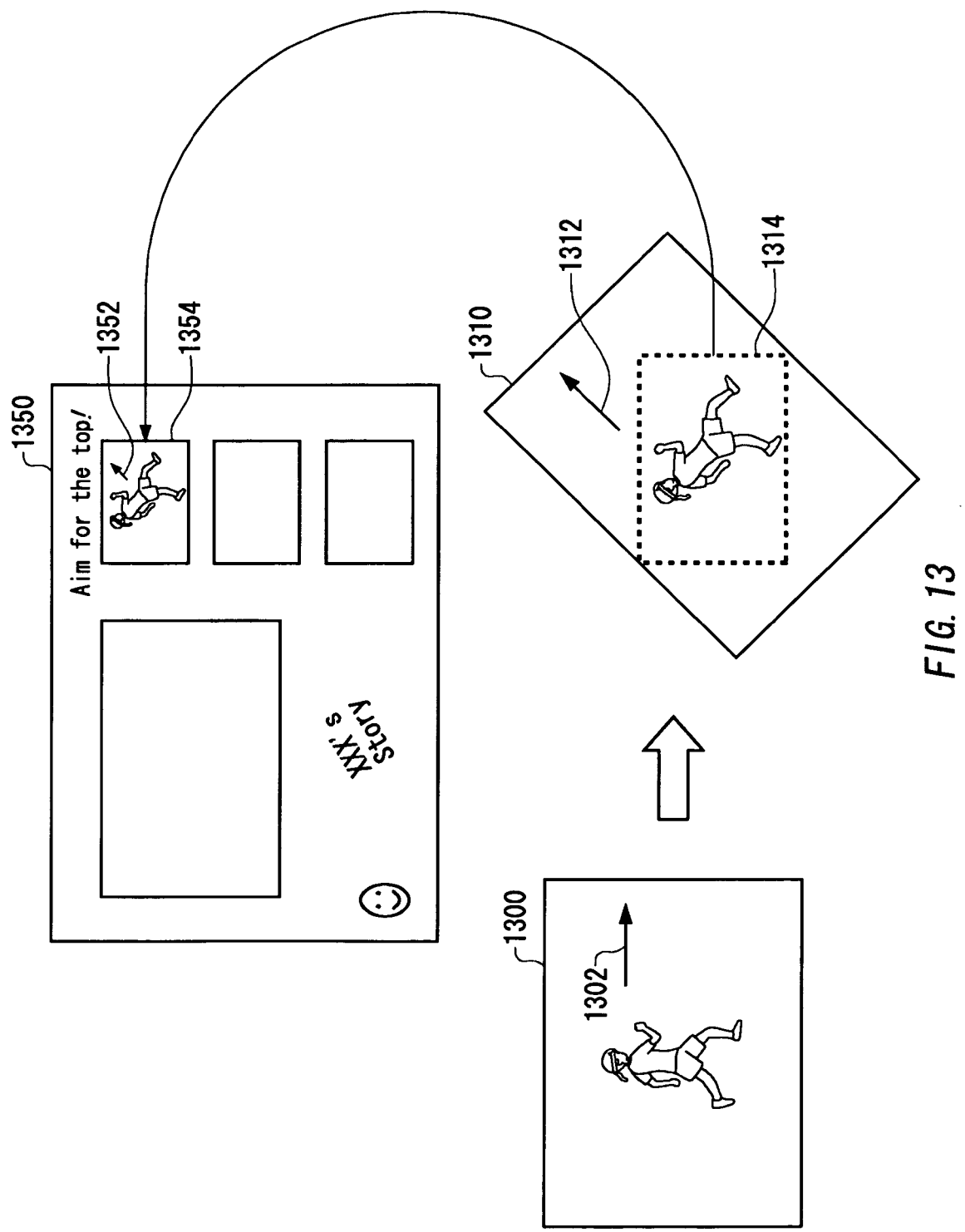
FIG. 13 is a view showing a process performed in an image rotation processing section 72 and a trimming section 70.

FIG. 13 is a view exemplary showing a process of the image rotation processing section 72 and the trimming section 70 according to the present embodiment. It is considered that a moving direction of a figure included in a moving-image constituting image is associated with composition information of a moving-image constituting image to be arranged at an image arrangement frame 1354 corresponding to an image arrangement position included in a template 1350. That is, it is considered that composition information related to a moving direction of a figure is associated with the image arrangement frame 1354 so that a moving-image constituting image of which a moving direction of a figure faces a direction 1352 is arranged in regard to the direction 1352.

Here, when the moving image constituting image extracting section 30 can extract only a moving-image constituting image 1300 including a figure moving to a direction 1302, the image rotation processing section 72 rotates the moving-image constituting image 1300 along a horizontal direction on a surface of the moving-image constituting image 1300 so that the moving direction 1302 of figure included in the moving-image constituting image 1300 is identical with information showing the moving direction associated with the image arrangement frame 1354 of the template 1350, i.e., the direction 1352. Subsequently, the trimming section 70 trims off an image 1314 with the shape of the image arrangement frame 1354 from a moving-image constituting image 1310 rotated by the image rotation processing section 72. Then, the trimming section 70 supplies the trimmed image 1314 to the image layout section 50, and the image layout section 50 lays out the image 1314 in the image arrangement frame 1354.

According to the image output apparatus 10 of the present embodiment, although there is not a moving-image constituting image identical with composition information associated with an image arrangement position included in a template, it is possible to automatically rotate a moving-image constituting image to harmonize the moving-image constituting image with the composition information. In this way, since a user does not take a moving image including a moving-image constituting image identical with composition information once more or a user does not perform an image processing on a moving-image constituting image to form the moving-image constituting image identical with composition information by hand, it is possible to largely reduce trouble of a work.

Figure 14:
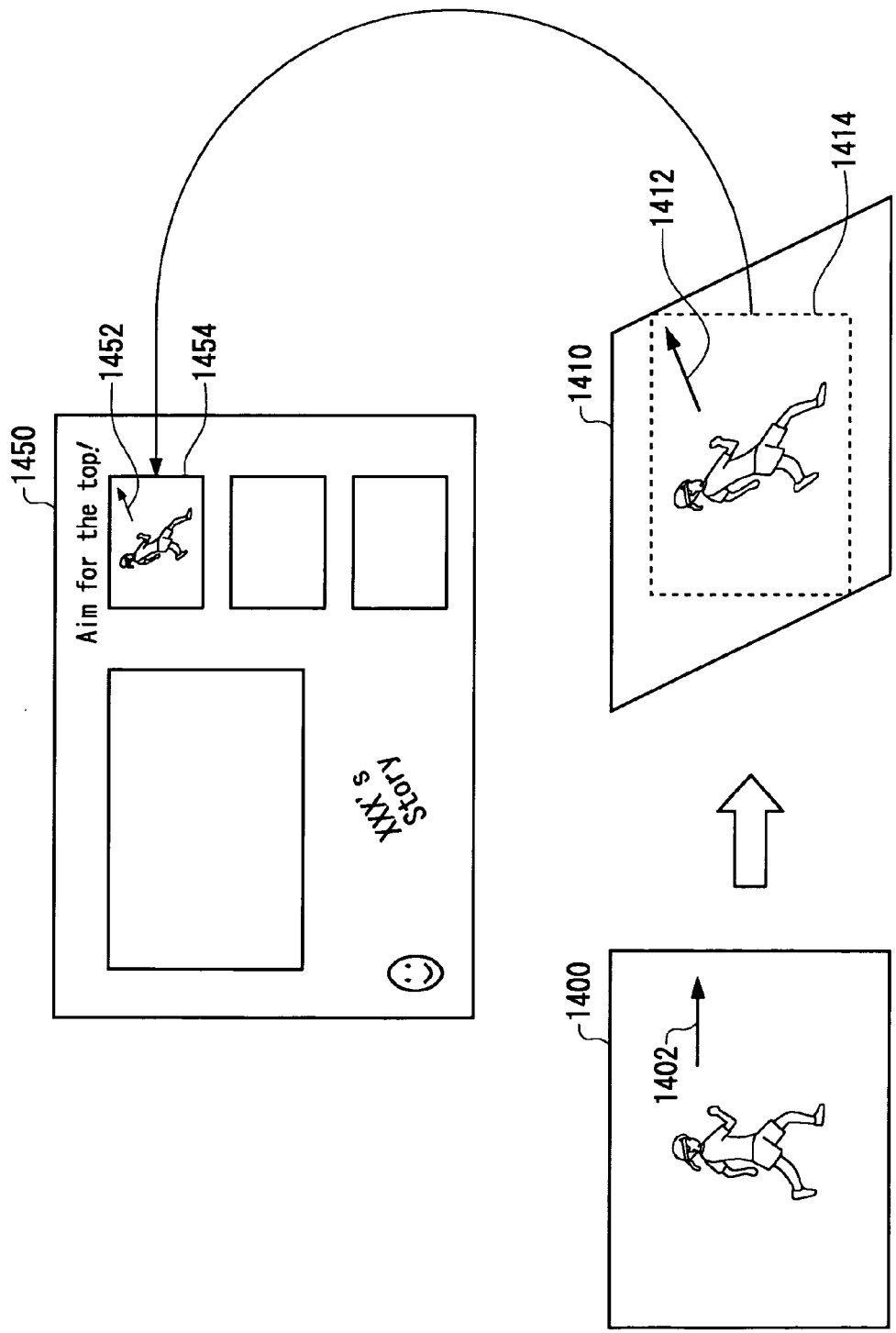
FIG. 14 is a view showing a process performed in a transformed image generating section 74 and a trimming section 70.

FIG. 14 is a view exemplary showing a process of the transformed image generating section 74 and the trimming section 70 according to the present embodiment. It is considered that a moving direction of an object is associated with composition information of a moving-image constituting image to be arranged at an image arrangement frame 1454 corresponding to an image arrangement position included in a template 1450. That is, it is considered that a direction 1452 is associated with the image arrangement frame 1454 as composition information.

Here, it is considered that the moving image constituting image extracting section 30 can extract only a moving-image constituting image 1400 including a figure having a moving direction 1402. In this case, the transformed image generating section 74 generates an image 1410 made by performing geometric transformation on the moving-image constituting image 1400 so that the direction 1452 associated with the image arrangement frame 1454 of the template 1450 is identical with the moving direction 1402 of figure included in the moving-image constituting image 1400. That is, the transformed image generating section 74 performs geometric transformation on the moving-image constituting image 1400 so that the moving direction 1402 is identical with a direction 1412. For example, geometric transformation may be affine transformation. Then, the trimming section 70 trims off the image 1410 transformed by the transformed image generating section 74 in the shape of the image arrangement frame 1454. Subsequently, the image layout section 50 lays out an image 1414 trimmed by the trimming section 70 in the image arrangement frame 1454.

According to the image output apparatus 10 of the present embodiment, since the image output apparatus 10 can generate an image made by performing geometric transformation on a moving-image constituting image to lay out the image at an image arrangement position when there is not a moving-image constituting image identical with composition information associated with the image arrangement position of the template, it is possible to automatically lay out an image having information identical with composition information previously associated with an image arrangement position of a template without capturing a moving image and making an image in order to acquire a desired moving-image constituting image once more, even if the moving image constituting image extracting section 30 cannot extract a moving-image constituting image corresponding to composition information of the moving-image constituting image to be arranged at the image arrangement position.

Figure 15:
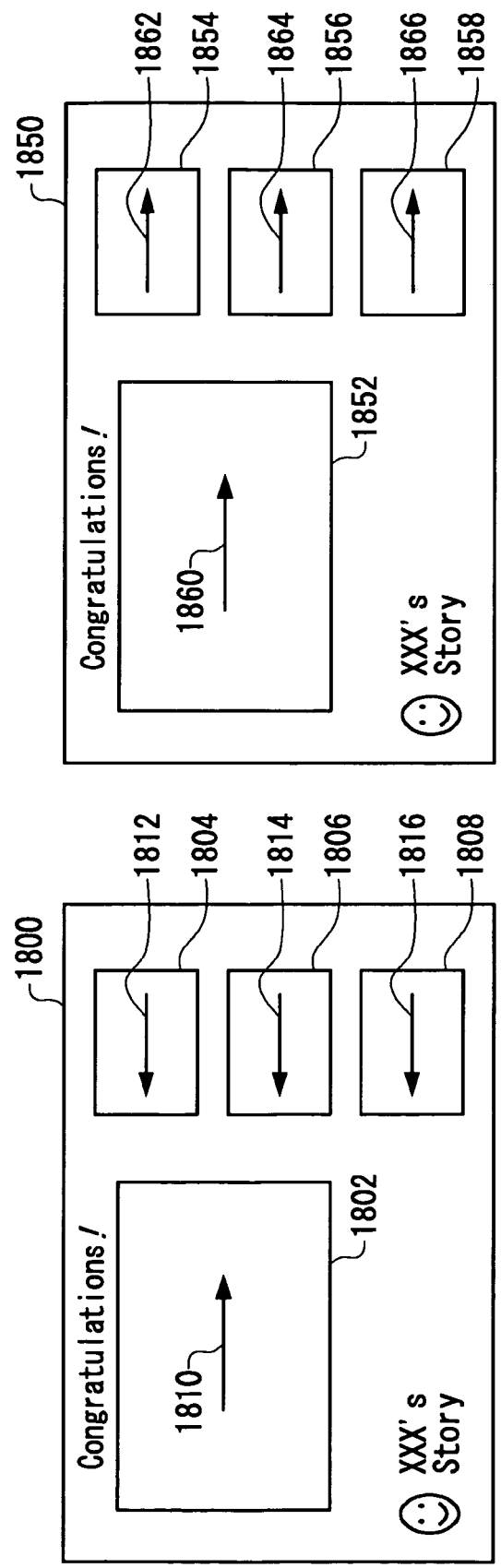
FIG. 15 is a view showing a process performed in a moving direction determining section 45.

FIG. 15 is a view exemplary showing a process of the moving direction determining section 45 according to the present embodiment. At first, the template storing section 25 stores a template of an output area for which at least one image arrangement position at which moving-image constituting images should be arranged has predetermined. Specifically, the template storing section 25 may store a template of an output area for which a first image arrangement position at which a first moving-image constituting image should be arranged and a second image arrangement position at which a second moving-image constituting image should be arranged have been predetermined. Then, the first image selecting section 34 selects the first moving-image constituting image to be arranged at the first image arrangement position. Subsequently, the moving direction determining section 45 determines a moving direction of an object included in the second moving-image constituting image to be arranged at the second image arrangement position according to the moving direction of object included in the first moving-image constituting image selected by the first image selecting section 34. Moreover, the moving direction determining section 45 may determine a moving direction of an object included in the second moving-image constituting image to be arranged at the second image arrangement position, based on the moving direction of object included in the first moving-image constituting image selected by the first image selecting section 34 and a relative moving direction of an object stored on the template storing section 25.

For example, in a template 1800, it is considered that a moving-image constituting image selected by the first image selecting section 34 is laid out at an image arrangement position 1802 and a moving direction of an object included in the moving-image constituting image is a direction 1810. In this case, the moving direction determining section 45 may associate a direction 1812 or the like with an image arrangement position 1804 or the like in order that moving-image constituting images facing a direction opposite to the direction 1810 are arranged at the image arrangement position 1804 or the like. Moreover, in a template 1850, it is considered that a moving-image constituting image selected by the first image selecting section 34 is laid out at an image arrangement position 1852 and a moving direction of an object included in the moving-image constituting image is a direction 1860. In this case, the moving direction determining section 45 may associate a direction 1862 or the like with an image arrangement position 1854 or the like in order that moving-image constituting images facing the same direction as the direction 1860 are arranged at the image arrangement position 1854 or the like. In addition, the moving direction determining section 45 may respectively associate a moving direction different from one another with each image arrangement position when a template includes a plurality of image arrangement positions.

Then, the second image selecting section 36 selects the second moving-image constituting image including an object that moves to the moving direction determined by the moving direction determining section 45, from the moving-image constituting images extracted from the moving image constituting image extracting section 30. Then, the image layout section 50 respectively lays out moving-image constituting images selected by the second image selecting section 36 at the image arrangement positions.

According to the image output apparatus 10 of the present embodiment, since a moving direction of an object included in a moving-image constituting image to be arranged in the second image arrangement frame can be determined according to a moving direction of an object included in a moving-image constituting image arranged in the first image arrangement frame, an image in which appropriate moving-image constituting images are automatically laid out can be output without selecting the second moving-image constituting image by a user.

Figure 16:
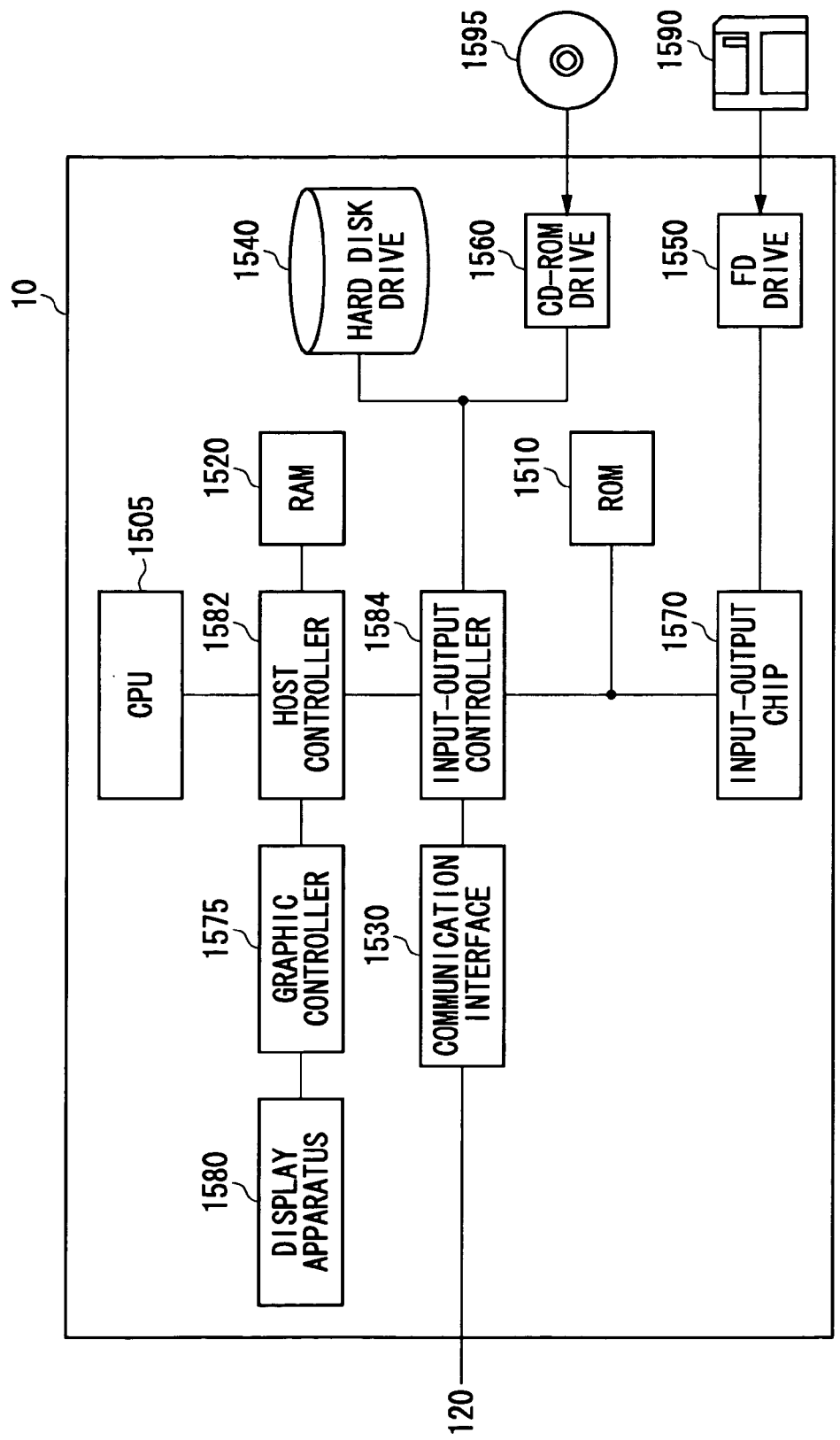
FIG. 16 is a block diagram showing a hardware configuration of an image output apparatus 10.

FIG. 16 is a view exemplary showing a hardware configuration of the image output apparatus 10 according to the present embodiment. The image output apparatus 10 includes a CPU peripheral section having a CPU 1505, a RAM 1520, a graphic controller 1575, and a display apparatus 1580 that are connected to one another by a host controller 1582, an input-output section having a communication interface 1530, a hard disk drive 1540, and a CD-ROM drive 1560 that are connected to the host controller 1582 by an input-output controller 1584, and a legacy input-output section having a ROM 1510, a flexible disk drive 1550, and an input-output chip 1570 that are connected to the input-output controller 1584.

The host controller 1582 connects the RAM 1520 to the CPU 1505 and the graphic controller 1575 for accessing the RAM 1520 at high transfer rate. The CPU 1505 operates based on a program stored on the ROM 1510 and the RAM 1520 to control each section. The graphic controller 1575 acquires image data generated by the CPU 1505 on a frame buffer provided in the RAM 1520, and displays the data on the display apparatus 1580. Alternatively, the graphic controller 1575 may include therein the frame buffer storing the image data generated from the CPU 1505.

The input-output controller 1584 connects the host controller 1582 to the communication interface 1530, the hard disk drive 1540, and the CD-ROM drive 1560 that are a comparatively fast input-output apparatus. The communication interface 1530 communicates with another apparatus via a network 120. The hard disk drive 1540 stores a program and data to be used by the CPU 1505 in the image output apparatus 10. The CD-ROM drive 1560 reads a program or data from a CD-ROM 1595, and provides the program or data to the hard disk drive 1540 via the RAM 1520.

Moreover, the ROM 1510, the flexible disk drive 1550, and the input-output chip 1570 that are a comparatively low-speed input-output apparatus are connected to the input-output controller 1584. The ROM 1510 stores a boot program to be executed during starting the image output apparatus 10, a program dependent on hardware of the image output apparatus 10, or the like. The flexible disk drive 1550 reads a program or data from a flexible disk 1590, and provides the program or data to the hard disk drive 1540 via the RAM 1520. The input-output chip 1570 connects the flexible disk drive 1550 to various kinds of input-output apparatuses via a parallel port, a serial port, a keyboard port, a mouse port, or the like.

An image output program provided to the hard disk drive 1540 via the RAM 1520 is stored on a recording medium such as the flexible disk 1590, the CD-ROM 1595, or an IC card in order to be provided by a user. The image output program is read from the recording medium, is installed in the hard disk drive 1540 in the image output apparatus 10 via the RAM 1520, and is executed in the CPU 1505.

The image output program installed and executed in the image output apparatus 10 works on the CPU 1505 or the like and makes the image output apparatus 10 function as the image storing section 20, the template storing section 25, the moving image constituting image extracting section 30, the image selecting section 32, the first image selecting section 34, the second image selecting section 36, the moving direction specifying section 40, the moving direction determining section 45, the image layout section 50, the moving speed computing section 60, the trimming section 70, the image rotation processing section 72, the transformed image generating section 74, the trimming image generating section 76, the image outputting section 80, the display section 90, and the print section 100, which have been described with reference to FIGS. 1 to 15.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

As apparent from the above descriptions, according to the present invention, it is possible to realize an image output apparatus, an image output method, an image output program, an image trimming apparatus, an image trimming method, and an image trimming program for automatically laying out or trimming a moving-image constituting image to output the image without a sense of discomfort based on a moving direction of an object included in a moving-image constituting image extracted from a moving image.

What is claimed is:

1. An image output apparatus comprising:
   a moving image constituting image extracting section that extracts a moving-image constituting image from a moving image having a plurality of moving-image constituting images;
   a moving direction specifying section that specifies a moving direction, in the moving image, of an object included in the moving-image constituting image extracted from said moving image constituting image extracting section based on the change of position of the object in the plurality of continued moving-image constituting images;
   an image layout section that lays out the moving-image constituting image extracted from said moving image constituting image extracting section in an output area based on the moving direction of object specified by said moving direction specifying section;
   an image outputting section that outputs the moving-image constituting image laid-out by said image layout section on the output area;
   a template storing section that stores a template of an output area for which an image arrangement position and a moving direction of an object included in the moving-image constituting image to be arranged at the image arrangement position are predetermined; and
   an image selecting section that selects a moving-image constituting image, in which a moving direction of an object associated with the image arrangement position included in the template stored on said template storing section and the moving direction of object specified by said moving direction specifying section are identical with each other, from the moving-image constituting images extracted from said moving image constituting image extracting section, and said image layout section lays out the moving-image constituting image selected by said image selecting section at the image arrangement position in the template, wherein the template storing section stores a template of an output area of a page in an album.

2. The image output apparatus as claimed in claim 1, wherein said image layout section lays out the moving-image constituting image extracted from said moving image constituting image extracting section so that the moving direction of object specified by said moving direction specifying section faces a central direction of the output area.

3. The image output apparatus as claimed in claim 1, wherein said moving image constituting image extracting section extracts the plurality of continued moving-image constituting images from the moving image, and said image layout section serially lays out the plurality of moving-image constituting images extracted from said moving image constituting image extracting section along the moving direction specified by said moving direction specifying section.

4. The image output apparatus as claimed in claim 1, wherein the image output apparatus further comprises:

a moving speed computing section that computes a moving speed, in the moving image, of the object included in the moving-image constituting image extracted from said moving image constituting image extracting section based on the change of position of the object in the plurality of moving-image constituting images continued following the moving-image constituting image extracted from said moving image constituting image extracting section; and a trimming section that trims off a partial image including an object, of which the moving speed computed from said moving speed computing section is larger than a predetermined reference speed, from the moving-image constituting image extracted from said moving image constituting image extracting section, and said image layout section lays out the partial image trimmed by said trimming section in the output area based on the moving direction of object specified by said moving direction specifying section.

5. The image output apparatus as claimed in claim 4, wherein said trimming section trims off a partial image including an object, of which the moving speed computed from said moving speed computing section is the largest, from the moving-image constituting image extracted from said moving image constituting image extracting section.

6. The image output apparatus as claimed in claim 4, wherein said trimming section trims off a partial image including an object, of which an area is the largest in the moving-image constituting image, among objects of which the moving speed computed from said moving speed computing section is larger than the predetermined reference speed from the moving-image constituting image extracted from said moving image constituting image extracting section.

7. The image output apparatus as claimed in claim 1, wherein said image outputting section has a display section for displaying the moving-image constituting image laid-out by said image layout section, and said image layout section lays out the moving-image constituting image in an output area on a display screen of said display section based on the moving direction of object specified by said moving direction specifying section.

8. The image output apparatus as claimed in claim 1, wherein said image outputting section has a print section for printing the moving-image constituting image laid-out by said image layout section, and said image layout section lays out the moving-image constituting image in an output area on a printing medium of said print section based on the moving direction of object specified by said moving direction specifying section.

9. The image output apparatus as claimed in claim 1, wherein said image selecting section selects a moving-image constituting image, around which the size of an area within a moving-image constituting image existing in the moving direction of object specified by said moving direction specifying section is larger than the size of an area within a moving-image constituting image existing in the direction opposite to the direction specified by said moving direction specifying section, from the plurality of continued moving-image constituting images.

10. The image output apparatus as claimed in claim 1, wherein the image output apparatus further comprises a trimming image generating section that trims off an object included in the moving-image constituting image selected by said image selecting section to generate a trimming image so that the size of an area within a moving-image constituting image existing in the moving direction of object specified by said moving direction specifying section is larger than the size of an area within a moving-image constituting image existing in the direction opposite to the direction of object specified by said moving direction specifying section, and said image layout section lays out the trimming image generated from said trimming image generating section at the image arrangement position in the template.

11. The image output apparatus as claimed in claim 1, wherein the image output apparatus further comprises a transformed image generating section that generates an image made by performing geometric transformation on a moving-image constituting image, so that the moving direction of object specified by said moving direction specifying section and the moving direction of object associated with the image arrangement position of the template stored on said template storing section are identical with each other, when there is not a moving-image constituting image in which the moving direction of object specified by said moving direction specifying section and the moving direction of object associated with the image arrangement position of the template stored on said template storing section are identical with each other, and said image layout section lays out the image generated from said transformed image generating section at the image arrangement position.

12. The image output apparatus as claimed in claim 11, wherein the image output apparatus further comprises a trimming section that trims off the image generated from said transformed image generating section in the shape of an image arrangement frame of the image arrangement position, and said image layout section lays out the image trimmed by said trimming section at the image arrangement position.

13. The image output apparatus as claimed in claim 1, wherein the image output apparatus further comprises an image rotation processing section that rotates a moving-image constituting image along a horizontal direction of a surface on the moving-image constituting image, so that the moving direction of object specified by said moving direction specifying section and the moving direction associated with the image arrangement position of the template stored on said template storing section are identical with each other, when there is not a moving-image constituting image in which the moving direction of object specified by said moving direction specifying section and the moving direction associated with the image arrangement position of the template stored on said template storing section are identical with each other, and said image layout section lays out the moving-image constituting image rotated by said image rotation processing section at the image arrangement position in the template.

14. The image output apparatus as claimed in claim 13, wherein the image output apparatus further comprises a trimming section that trims off the moving-image constituting image rotated by said image rotation processing section in the shape of an image arrangement frame of the image arrangement position, and said image layout section lays out the image trimmed by said trimming section at the image arrangement position.

15. The image output apparatus as claimed in claim 1, wherein the image output apparatus further comprises a moving speed computing section that computes a moving speed, in a moving image, of the object included in the moving-image constituting image extracted from said moving image constituting image extracting section based on the change of position of the object in a plurality of moving-image constituting images continued following the moving-image constituting image extracted from said moving image constituting image extracting section, and said image selecting section selects a moving-image constituting image in which the size of an area is larger among moving-image constituting images existing in the moving direction of object specified by said moving direction specifying section when the moving speed of object computed from said moving speed computing section is larger.

16. The image output apparatus as claimed in claim 15, wherein the image output apparatus further comprises a trimming image generating section that trims off an object included in the moving-image constituting image selected by said image selecting section to generate a trimming image, so that the size of area within a moving-image constituting image existing in the moving direction of object specified by said moving direction specifying section is larger than the size of area within a moving-image constituting image existing in a direction opposite to the moving direction of object specified by said moving direction specifying section, when the moving speed of object computed from said moving speed computing section is larger, and said image layout section lays out the trimming image generated from said trimming image generating section at the image arrangement position in the template.

17. The image output apparatus as claimed in claim 1, wherein the image output apparatus further comprises:

a template storing section that stores a template of an output area for which a first image arrangement position at which a first moving-image constituting image should be arranged and a second image arrangement position at which a second moving-image constituting image should be arranged are predetermined;

a first image selecting section that selects the first moving-image constituting image to be arranged at the first image arrangement position;

a moving direction determining section that determines a moving direction of an object included in the second moving-image constituting image to be arranged at the second image arrangement position according to a moving direction of an object included in the first moving-image constituting image selected by said first image selecting section; and a second image selecting section that selects the second moving-image constituting image including an object with the moving direction determined by said moving direction determining section, and said image layout section lays out the first moving-image constituting image selected by said first image selecting section at the first image arrangement position and the second moving-image constituting image selected by said second image selecting section at the second image arrangement position.

18. The image output apparatus as claimed in claim 17, wherein said template storing section stores a template of an output area for which the second image arrangement position and a moving direction of an object relative to the moving direction of object included in the first moving-image constituting image are predetermined, and said moving direction determining section determines a moving direction of an object included in the second moving-image constituting image to be arranged at the second image arrangement position based on the moving direction of object included in the first moving-image constituting image selected by said first image selecting section and the relative moving direction of object stored on said template storing section.

19. The image output apparatus as claimed in claim 1, wherein the page of the album is a cover, a spread page, or one page of spread pages in the album.

20. An image output method comprising:

a moving image constituting image extracting step of extracting a moving-image constituting image from a moving image having a plurality of moving-image constituting images;

a moving direction specifying step of specifying a moving direction, in the moving image, of an object included in the moving-image constituting image extracted in said moving image constituting image extracting step based on the change of position of the object in the plurality of continued moving-image constituting images;

an image layout step of laying out the moving-image constituting image extracted in said moving image constituting image extracting step in an output area based on the moving direction of object specified in said moving direction specifying step;

an image outputting step of outputting the moving-image constituting image laid-out in said image layout step on the output area, an image selecting step of selecting a moving-image constituting image, in which a moving direction of an object associated with the image arrangement position included in a stored template and the moving direction of object specified by said moving direction specifying step are identical with each other, from the moving-image constituting images extracted from said moving image constituting image extracting step, wherein
the template is a template of an output area for which an image arrangement position and a moving direction of an object included in the moving-image constituting image to be arranged at the image arrangement position are predetermined, and the template is a template of an output area of a page in an album; and said image layout step lays out the moving-image constituting image selected by said image selecting step at the image arrangement position in the template.

21. A computer readable medium containing executable instructions for an image output apparatus that outputs images, wherein the instructions cause a processor of the image output apparatus to:

extract a moving-image constituting image from a moving image having a plurality of moving-image constituting images;

specify a moving direction, in the moving image, of an object included in the extracted moving-image constituting image based on the change of position of the object in the plurality of continued moving-image constituting images;

lay out the extracted moving-image constituting image in an output area based on the moving direction of object specified by said moving direction specifying section;

output the moving-image constituting image laid-out by said laying out step on the output area;

select a moving-image constituting image, in which a moving direction of an object associated with the image arrangement position included in a stored template and the moving direction of object specified by said moving direction specifying step are identical with each other, from the moving-image constituting images extracted from said moving image constituting image extracting step, wherein
the template is a template of an output area for which an image arrangement position and a moving direction of an object included in the moving-image constituting image to be arranged at the image arrangement position are predetermined, and the template is a template of an output area of a page in an album; and said laying out step lays out the moving-image constituting image selected by said moving-image selecting step at the image arrangement position in the template.

* * * * *